(12) United States Patent
Ndamka et al.

(10) Patent No.: US 11,952,317 B2
(45) Date of Patent: *Apr. 9, 2024

(54) CMAS-RESISTANT BARRIER COATINGS

(71) Applicants: Rolls-Royce Corporation, Indianapolis, IN (US); Rolls-Royce plc, London (GB)

(72) Inventors: Ngunjoh Lawrence Ndamka, Derby (GB); Li Li, Carmel, IN (US); Stephanie Gong, Indianapolis, IN (US); Ann Bolcavage, Indianapolis, IN (US); Taylor K. Blair, Indianapolis, IN (US); Robert Golden, Noblesville, IN (US)

(73) Assignees: Rolls-Royce Corporation, Indianapolis, IN (US); Rolls-Royce plc, London (GB)

( * ) Notice: Subject to any disclaimer, the term of this patent is extended or adjusted under 35 U.S.C. 154(b) by 16 days.

This patent is subject to a terminal disclaimer.

(21) Appl. No.: 16/657,504

(22) Filed: Oct. 18, 2019

(65) Prior Publication Data

US 2020/0123071 A1    Apr. 23, 2020

Related U.S. Application Data

(60) Provisional application No. 62/876,272, filed on Jul. 19, 2019, provisional application No. 62/796,977, (Continued)

(51) Int. Cl.
*C04B 41/50*    (2006.01)
*C04B 41/45*    (2006.01)
*F01D 5/28*    (2006.01)

(52) U.S. Cl.
CPC ...... *C04B 41/5024* (2013.01); *C04B 41/4543* (2013.01); *F01D 5/284* (2013.01); *F01D 5/288* (2013.01)

(58) Field of Classification Search
CPC ............... C04B 41/52; C04B 2111/00405
See application file for complete search history.

(56) References Cited

U.S. PATENT DOCUMENTS

| 4,696,855 | A  | 9/1987 | Pettit, Jr. et al. |
| 6,478,234 | B1 | 11/2002 | Klein et al. |
| (Continued) |

FOREIGN PATENT DOCUMENTS

| DE | 4129120 A1 | 3/1993 |
| EP | 3235795 A1 | 10/2017 |
| WO | 2017154559 A1 | 9/2017 |

OTHER PUBLICATIONS (Gordon England, "Nature of Thermal Spray Coatings", 2015, p. 1-9; Accessed at http:/web.archive.org/web/20010222103733/http://www.gordonengland.co.uk/tsc.htm.*

(Continued)

*Primary Examiner* — Mark Ruthkosky
*Assistant Examiner* — Julia L Rummel
(74) *Attorney, Agent, or Firm* — Shumaker & Sieffert, P.A.

(57) ABSTRACT

An example article includes a substrate and a barrier coating on the substrate. The barrier coating includes a matrix including a rare-earth disilicate extending from an inner interface facing the substrate to an outer surface opposite the inner interface. The barrier coating includes a graded volumetric distribution of rare-earth oxide rich (REO-rich) phase regions in the matrix along a direction from the inner interface to the outer surface. The graded volumetric distribution defines a first volumetric density of the REO-rich phase regions at a first region of the matrix adjacent the outer surface. The graded volumetric distribution defines a second volumetric density of the REO-rich phase regions at a second region of the matrix adjacent the inner surface. The second volumetric density is different from the first volu- (Continued)

metric density. An example technique includes forming the barrier coating on the substrate of a component.

11 Claims, 23 Drawing Sheets

Related U.S. Application Data filed on Jan. 25, 2019, provisional application No. 62/747,535, filed on Oct. 18, 2018.

(56) References Cited

U.S. PATENT DOCUMENTS

| | | | |
|---|---|---|---|
| 7,595,114 B2 | 9/2009 | Meschter et al. | |
| 9,365,725 B2 | 6/2016 | Sarrafi-Nour et al. | |
| 10,125,618 B2 | 11/2018 | Lee | |
| 2002/0018902 A1* | 2/2002 | Tsukatani | C23C 4/11 428/697 |
| 2006/0014029 A1* | 1/2006 | Saak | C23C 28/042 428/446 |
| 2010/0080984 A1 | 4/2010 | Lee | |
| 2011/0027556 A1* | 2/2011 | Kirby | C04B 41/009 428/319.1 |
| 2013/0136915 A1 | 5/2013 | Naik | |
| 2014/0255680 A1 | 9/2014 | Lee et al. | |
| 2014/0261080 A1 | 9/2014 | Lee | |
| 2016/0108510 A1 | 4/2016 | Kirby et al. | |
| 2017/0130313 A1* | 5/2017 | Gold | C23C 14/08 |
| 2018/0030586 A1 | 2/2018 | Strock | |
| 2018/0163062 A1 | 6/2018 | Hoel et al. | |
| 2019/0092702 A1 | 3/2019 | Yamaguchi et al. | |
| 2019/0382880 A1* | 12/2019 | He | C23C 16/4404 |

OTHER PUBLICATIONS

Hubbard et al., "RIR—Measurement and Use in Quantitative XRD," Powder Diffraction, vol. 3, No. 2, Jun. 1988, p. 74.

Zhu et al., "Development of Advanced Environmental Barrier Coatings for SiC/SiC Ceramic Matrix Composites: Path toward 2700° F. Temperature Capability and Beyond," 41st Annual Conference on Composites, Materials, and Structures, Jan. 23-27, 2017, 24 pp.

Webster et al., "Mixed Ytterbium Silicate Environmental Barrier Coating Materials for CMAS Resistance," Gordon Research Seminar: High Temperature Corrosion 2019, Deposit Induced Corrosion of Alloys and Coatings, Jul. 20, 2019, 30 pp.

Webster et al., "Interaction of Yb2Si2O7 and Yb2SiO5 Environmental Barrier Coating Materials with CMAS Melts," 43rd International Conference and Exposition on Advanced Ceramics and Composites Session—CMAS Degradation of EBC/TBC: Effects and Mitigation Strategies I, Jan. 29, 2019, 20 pp.

Response to Extended Search Report dated Feb. 20, 2020, from counterpart European Application No. 19204066.5, filed Oct. 16, 2020, 26 pp.

Richards et al., "Structure, Composition, and Defect Control During Plasma Spray Deposition of Ytterbium Silicate Coatings," Journal of Materials Science, vol. 50 No. 24, Dec. 2015, pp. 7939-7957.

Examination Report from counterpart European Application No. 19204066.5, dated Feb. 20, 2020, 20 pp.

Zhang et al., "Effect of Injection Angle on Particles In-Flight Characteristics", 9th AIAA/ASME Joint Thermodynamics and heat Transfer Conference, Jun. 2006, 8 pp.

Notice of Intent to Grant and Text Intended to Grant from counterpart European Application No. 19204066.5 dated Nov. 9, 2022, 60 pp.

\* cited by examiner

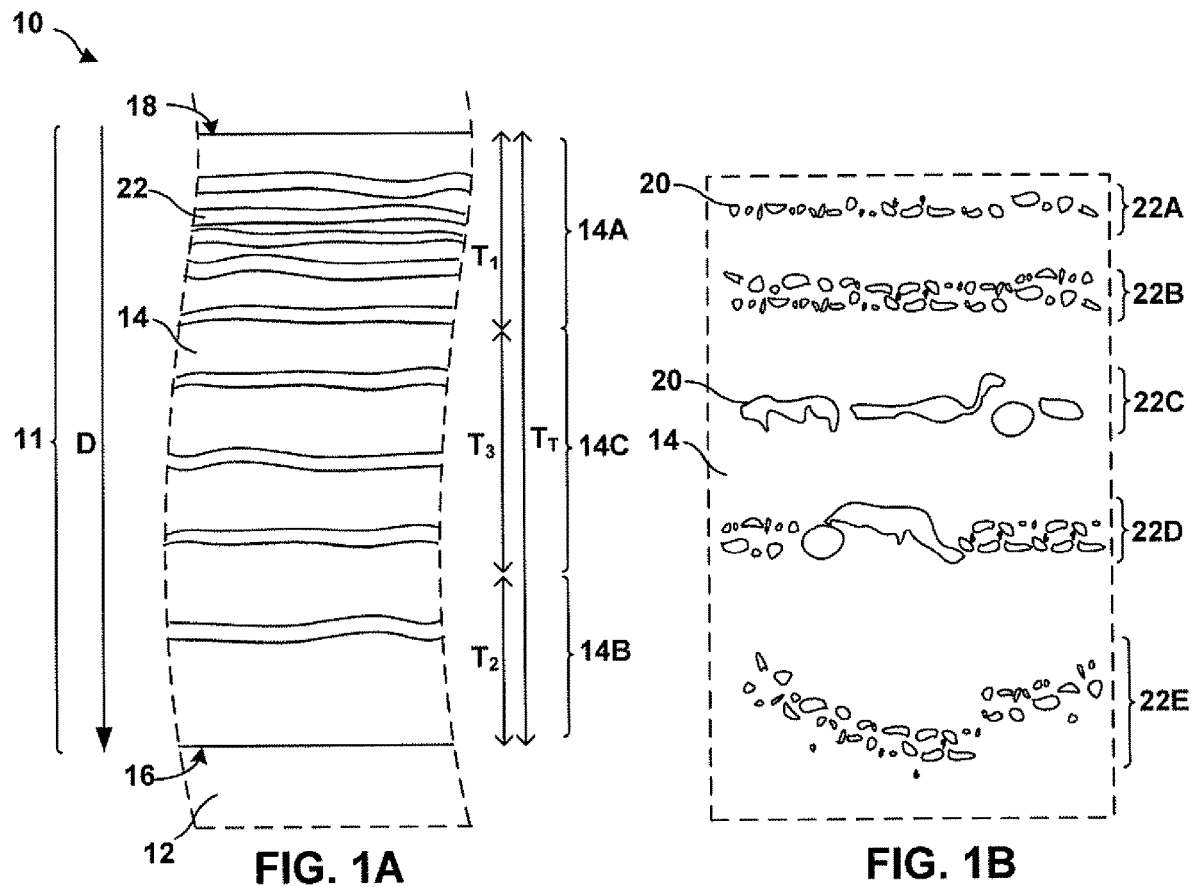
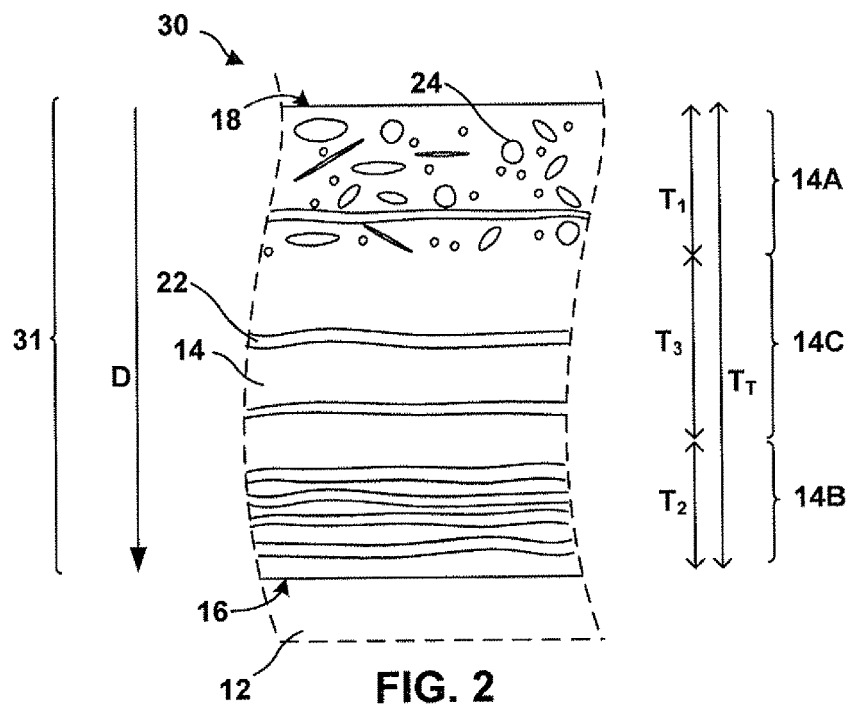

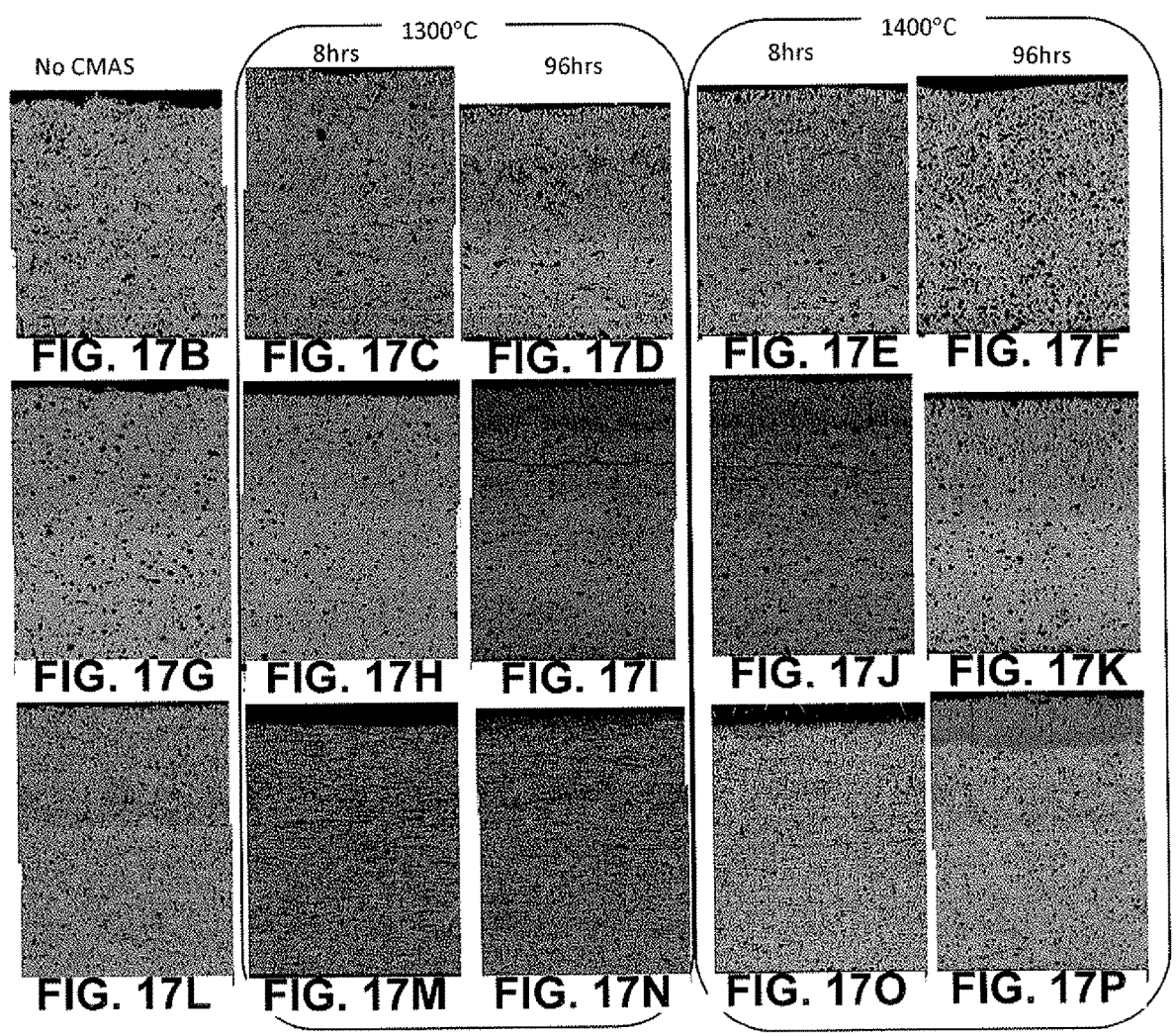

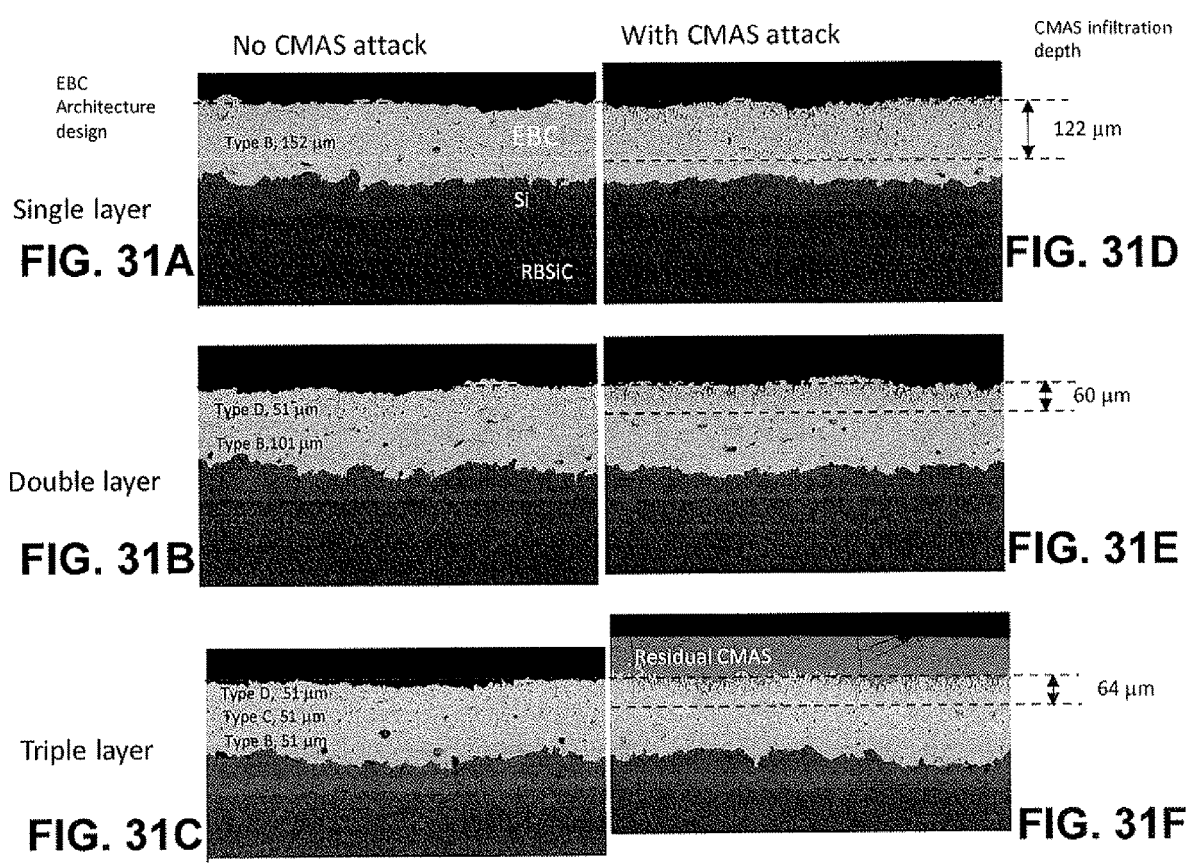

CMAS-RESISTANT BARRIER COATINGS

This application claims the benefit of U.S. Provisional Application number claims the benefit of U.S. Provisional Application Ser. No. 62/747,535, filed Oct. 18, 2018, U.S. Provisional Application Ser. No. 62/796,977, filed Jan. 25, 2019, and U.S. Provisional Application Ser. No. 62/876,272, filed Jul. 19, 2019, which are incorporated herein by reference in its entirety.

TECHNICAL FIELD

The disclosure relates to barrier coatings (EBCs), in particular, CMAS-resistant barrier coatings used for high temperature components.

BACKGROUND

High temperature components such as engines face increasing performance demands at higher temperatures. Under certain operating conditions, siliceous materials such as airborne dust, sand, fly ash, volcanic dust, concrete dust, and fuel residue ingested into a high temperature component may accumulate on certain hot surfaces, for example, on blade, vanes, combustion tiles and turbine segments. These materials may fuse and melt when exposed to high temperatures, for example, temperatures above 1240° C., depending on the composition of the deposited materials. calcium-magnesium-alumino-silicate (CMAS), is the general name given to these molten deposits, as the predominant oxides are Calcia (CaO), Magnesia (MgO), Alumina ($Al_2O_3$) and Silica ($SiO_2$).

Engine components may be coated with one or more barrier layers to provide protection against thermal flux, erosion, and/or environmental contamination, for example, by reducing or preventing CMAS formation, migration, or infiltration.

SUMMARY

The disclosure describes example barrier coatings, for example, environmental barrier coatings (EBCs), thermal barrier coatings (TBCs), or abradable coatings, and techniques and systems for manufacturing barrier coatings.

In some examples, the disclosure describes an example article including a substrate and a barrier coating on the substrate. The barrier coating includes a matrix including a rare-earth disilicate extending from an inner interface facing the substrate to an outer surface opposite the inner interface. The barrier coating includes a graded volumetric distribution of rare-earth oxide rich (REO-rich) phase regions in the matrix along a direction from the inner interface to the outer surface. The graded volumetric distribution defines a first volumetric density of the REO-rich phase regions at a first region of the matrix adjacent the outer surface. The graded volumetric distribution defines a second volumetric density of the REO-rich phase regions at a second region of the matrix adjacent the inner surface. The second volumetric density is different from the first volumetric density.

In some examples, the disclosure describes an example technique including forming a barrier coating adjacent a substrate of a component. The barrier coating includes a matrix including a rare-earth disilicate extending from an inner interface facing the substrate to an outer surface opposite the inner interface. The barrier coating includes a graded volumetric distribution of rare-earth oxide rich (REO-rich) phase regions in the matrix along a direction from the inner interface to the outer surface. The graded volumetric distribution defines a first volumetric density of the REO-rich phase regions at a first region of the matrix adjacent the outer surface. The graded volumetric distribution defines a second volumetric density of the REO-rich phase regions at a second region of the matrix adjacent the inner surface. The second volumetric density is different from the first volumetric density.

The details of one or more examples are set forth in the accompanying drawings and the description below. Other features, objects, and advantages will be apparent from the description and drawings, and from the claims.

BRIEF DESCRIPTION OF DRAWINGS

FIG. 1A is a conceptual cross-sectional view of an example article including an example barrier coating on a substrate of a component, where the barrier coating has a higher volumetric density of rare-earth oxide-rich phase regions in a first region nearer an outer surface of the barrier coating than in a second region nearer the substrate.

FIG. 1B is a conceptual cross-sectional magnified view of the article of FIG. 1A illustrating example bands defined by rare-earth oxide-rich phase regions.

FIG. 2 is a conceptual cross-sectional view of an example article including an example barrier coating adjacent a substrate of a component, where the barrier coating has a higher volumetric density of rare-earth oxide-rich phase regions in a second region nearer the substrate than in a first region nearer an outer surface of the barrier coating.

FIGS. 17A-17P are magnified views of portions of some of the samples shown in FIGS. 16A-16E.

FIGS. 31A-31F are micrographs illustrating samples formed with different layer combinations before and after CMAS exposure.

DETAILED DESCRIPTION

Figure 3:
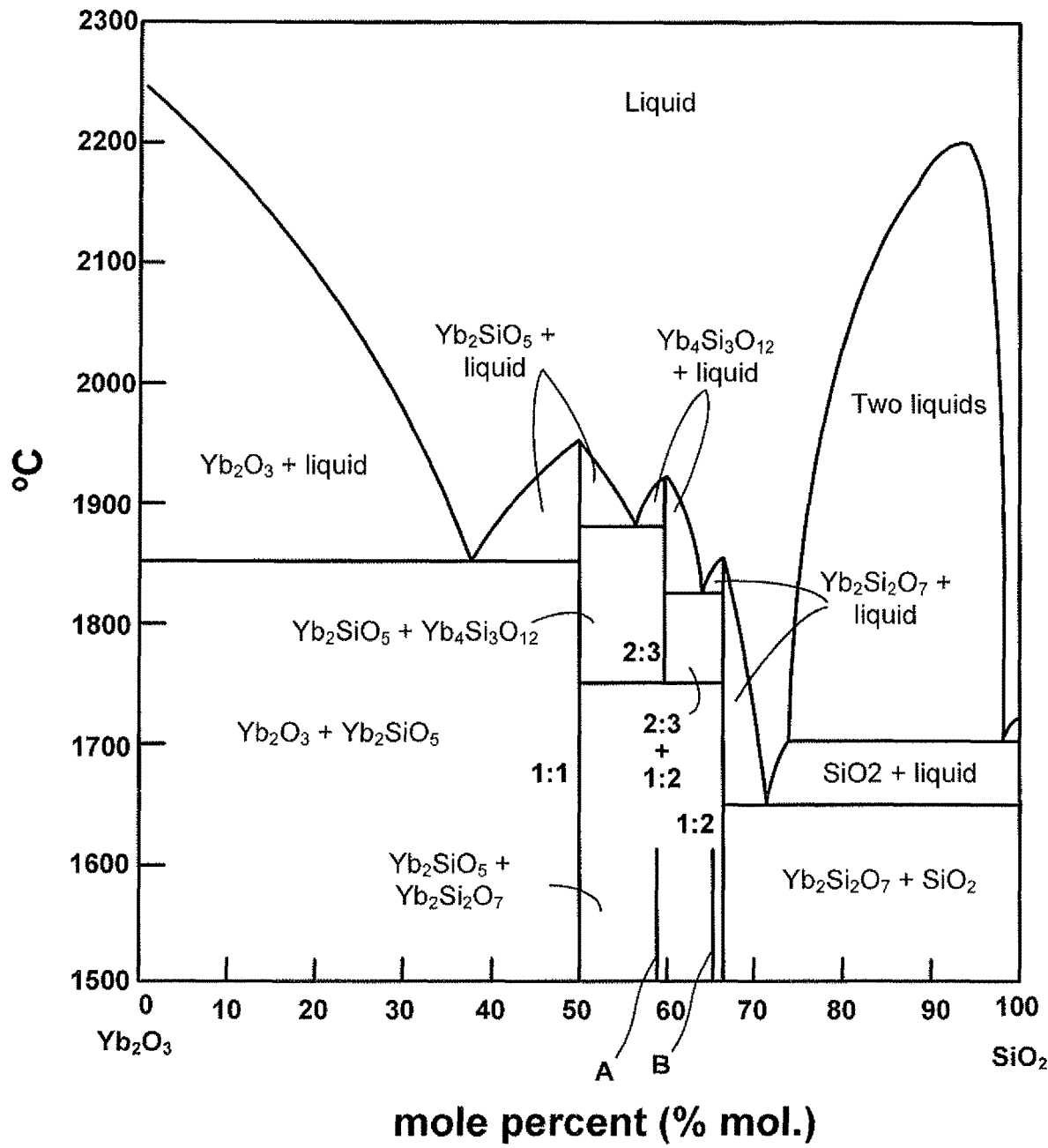
FIG. 3 is a chart illustrating a phase diagram of an ytterbia-silica system.

The disclosure generally describes example barrier coatings, for example, environmental barrier coatings (EBCs), thermal barrier coatings (TBCs), or abradable coatings, and techniques for manufacturing barrier coatings. Barrier coatings according to the disclosure may include a matrix including at least one rare-earth disilicate, and a graded distribution of rare-earth oxide (REO)-rich phase regions in the matrix. Barrier coatings according to the disclosure may be useful in high-temperature applications, for example, as EBCs, TBCs, abradable coatings, or combinations thereof. Incorporating REO-rich phase regions with graded distributed in a rare-earth disilicate matrix may promote crack healing after heat treatment, and the coating may be more hermetic to resist ingression of oxidant species and CMAS, may improve water vapor resistance by reducing surface recession/volatilization rate, may improve CMAS resistance by reaction with $SiO_2$ in a melt, forming a rare-earth disilicate seal inhibiting further penetration of CMAS, or combinations thereof. In some examples, REO rich phases may react with CMAS to form stable products that slow the reaction/infiltration/penetration rate of CMAS (e.g. rare-earth disilicate, apatite $\{Ca_2RE_8(SiO_4)_6O_2\}$, diopside $\{Ca(Mg,Al)[(Si,Al)_2O_6]\}$ and garnet $\{RE_6Mg_5Si_5O_{24}\}$).

Thus, in some examples, barrier coatings according to the disclosure may allow high-temperature components to more safely operate in relatively higher temperature, steamy, or dusty environments, and may provide better coating strength, better resistance to oxidation, water vapor, and CMAS attack, or combinations thereof.

In some examples, REO-rich phase regions may define bands in predetermined locations within the matrix. After heat treatment, the bands of REO-rich phase regions (for example $Yb_2O_3$ rich phase regions) may help heal the cracks. However, the total amount of REO-rich phase may be controlled to certain level as excessive REO-rich phase content in the coating may promote the formation of through thickness segmented cracks due to coefficient of thermal expansion mismatch between REO-rich phase and rare-earth disilicate. The REO-rich phase regions may also exhibit a greater resistance to reaction with water vapor (e.g., a lower reaction rate with water vapor) than the rare earth disilicate matrix. In some examples, distributing a higher volumetric distribution of REO-rich phases adjacent an outer surface of the barrier coating (away from the substrate) may provide better water vapor resistance to the barrier coating as a whole.

In some examples, the REO-rich phase regions include rare-earth oxide in excess of stoichiometric rare-earth disilicate. In some examples, the REO-rich phase regions include rare-earth oxide in excess of stoichiometric rare-earth monosilicate.

In some examples, the REO-rich phase regions, for example, in bands, may decompose upon interaction with CMAS, dispersing REO precipitates (for example, $Yb_2O_3$ precipitates) into the rare earth disilicate (for example, ytterbium disilicate) matrix. The precipitates may then react with $SiO_2$ in the CMAS melt, forming a rare-earth disilicate, which may seal the barrier coating and reduce or inhibit further penetration of CMAS into the barrier coating. The barrier coating may also form an inter-diffusion zone to provide a supply of REO precipitates (e.g., from portions of the barrier coating nearer the substrate), while the unaffected regions of the barrier coating may act as a reservoir for the REO. Thus, the barrier coating may resist or arrest CMAS infiltration through the barrier coating and restrict CMAS effects to only an outer region of the barrier coating, protecting the underlying substrate.

FIG. 1A is a conceptual cross-sectional view of an example article 10 including an example barrier coating 11 on a substrate 12 of a component, where barrier coating 11 has a higher volumetric density of rare-earth oxide-rich phase regions in a first region nearer an outer surface of barrier coating 11 than in a second region nearer substrate 12.

The component may be a high-temperature component, for example, an industrial, automotive, or aeronautical component. In some examples, the component includes a gas turbine engine component, or the like. Substrate 12 may include at least one of a metal, alloy, or a ceramic, for example, a ceramic matrix composite (CMC). Barrier coating 11 may protect substrate 12 from an operating environment of component 12. For example, barrier coating 11 may protect substrate 12 from thermal incursions, or from external contaminants or species. In some examples, barrier coating 11 may include an EBC, a TBC, an abradable coating, or the like, or may exhibit combinations of functions corresponding to one or more of an abradable coating, an EBC, or a TBC.

Substrate 12 and barrier coating 11 each possess a respective coefficient of thermal expansion (CTE). The CTE of barrier coating 11 may be controlled based on the volumetric density and volumetric distribution of rare-earth oxide rich phases in one or more regions of barrier coating 11, as described elsewhere in the disclosure. As such, the CTE of barrier coating 11 may vary within barrier coating 11. In some examples, barrier coating 11, or at least a portion of barrier coating 11 adjacent to substrate 12, may exhibit a CTE that is the same as, or similar to that of substrate 12, so that barrier coating 11 and substrate 12 exhibit substantially similar thermal contraction or expansion. In some examples, the CTE of both substrate 12 and a region of barrier coating 11 adjacent substrate 12 may be less than $7 \times 10^{-6}/°$ C., or less than $6.5 \times 10^{-6}/°$ C., or less than $6 \times 10^{-6}/°$ C., or less than $5.5 \times 10^{-6}/°$ C., or about $5 \times 10^{-6}/°$ C. In some examples, the substrate 12 and a region of barrier coating 11 may differ by less than 20%, or less than 10%, or less than 5%. This may reduce or substantially eliminate stress caused by differential thermal expansion of substrate 12 and barrier coating 11 at the interface of substrate 12 and barrier coating 11 when substrate 12 and barrier coating 11 are heated and cooled. In this way, the integrity of barrier coating 11 may be maintained, and separation, cracking, or spallation of barrier coating 11 may be reduced or prevented, for example, at an interfacial region of barrier coating 11 and substrate 12. In some examples, article 10 further includes a bond coat applied to at least a portion of substrate 12, and barrier coating 11 is applied to or formed on the bond coat (not shown). Thus, the bond coat may promote adherence or retention of barrier coating 14 on substrate 14. The bond coat may include at least one metal, metalloid, alloy, ceramics, and mixtures or combinations thereof. In some examples, the bond coat includes elemental silicon.

Barrier coating 11 includes a matrix 14 extending from an inner interface 16 to an outer surface 18 opposite inner interface 16. Inner interface 16 faces substrate 12 of the component, and may directly contact substrate 12 or another intermediate coating layer, such as a bond coat. Barrier coating 11 defines a coating thickness along a direction (represented by arrow "D" in FIG. 1A) from outer surface 18 to inner interface 16. Matrix 14 defines a first region 14A adjacent outer surface 18, and having a first thickness $T_1$. Matrix 14 defines a second region 14B adjacent inner interface 16, and having a second thickness $T_2$. In some examples, matrix 14 also may define a third region 14C between first region 14A and second region 14B, and having a third thickness $T_3$. All of the thicknesses $T_1$, $T_2$, and $T_3$ are defined along the direction D. Thus, the total coating thickness of barrier coating 11 equals $T_1+T_2+T_3$. Any of $T_1$, $T_2$, or $T_3$ may be any suitable fraction of coating thickness of barrier coating 11. Thus, barrier coating 11, first region 14A, second region 14B, and third region 14C may have any suitable coating thickness. In some examples, the coating thickness of barrier coating 11 is between about 50 micrometers and about 500 micrometers. In some examples, second thickness $T_2$ is about 50 micrometers, third thickness $T_3$ is about 50 microns, and first thickness $T_1$ is about 25 micrometers. In some examples, barrier coating 11 may omit third region 14C, and matrix 14 may define only first region 14A and second region 14B. In such examples, $T_3=0$. In other examples, barrier coating 11 may include more than three regions arrayed in the direction D.

One or both of $T_1$ or $T_2$ may be greater than a predetermined threshold. In some examples, a ratio of the first thickness $T_1$ to the total thickness of barrier coating 11, $T_1/T_T$, is greater than about 0.01, or greater than about 0.05, or greater than about 0.1, or greater than about 0.2. In some examples, a second ratio of the second thickness $T_2$ to the coating thickness, $T_2/T_T$, is greater than about 0.01, or greater than about 0.05, or greater than about 0.1, or greater than about 0.2. The first ratio and the second ratio may be the same or different. In some examples, the sum of the first ratio and the second ratio is 1, i.e., the first and second regions define the total thickness of barrier coating 11.

Matrix 14 includes at least one rare-earth disilicate. In some examples, the rare-earth disilicate includes an ytterbium species. In some examples, the rare-earth disilicate includes ytterbium disilicate. In some examples, matrix 14 consists essentially of the rare-earth disilicate, for example, ytterbium disilicate. In addition to, or instead of, ytterbium silicate, matrix 14 may include one or more of scandium, yttrium, or lutetium silicates.

FIG. 1B is a conceptual cross-sectional magnified view of article 11 of FIG. 1A including a plurality of rare-earth oxide (REO)-rich phase regions 20 defining example bands 22A to 22E in distributed in matrix 14. Each REO-rich phase region of the plurality of REO-rich phase regions 20 is configured to disperse REO-rich precipitates into matrix 14 in response to reacting with calcia magnesia alumina-silicate (CMAS). In some examples, the REO-rich precipitates are configured to react with $SiO_2$ (for example, isolated $SiO_2$, or an $SiO_2$ group in a compound or a species such as CMAS) to form a CMAS-resistant rare-earth disilicate seal. The plurality of REO-rich phase regions 20 may include a rare earth monosilicate and/or free rare earth oxide (i.e., rare earth oxide that is not present in a compound including another component). In some examples, the rare earth monosilicate and/or free rare earth oxide includes the same rare earth as matrix 14. In other examples, the rare earth monosilicate and/or free rare earth oxide includes a different rare earth than matrix 14.

In some examples, the rare-earth disilicate of matrix 14 includes ytterbium disilicate, and the plurality of REO-rich phase regions 20 includes free ytterbium oxide (i.e., ytterbium oxide that is not present in a compound including another component). In some examples, the plurality of REO-rich phase regions 20 includes ytterbium monosilicate instead of or in addition to ytterbium oxide. In addition to, or instead of, ytterbium oxide and/or monosilicate, REO-rich phase regions 20 may include one or more oxides and/or monosilicates of scandium, yttrium, or lutetium. In some examples, REO-rich phase regions 20 include rare-earth oxide in excess of stoichiometric rare-earth disilicate.

In some examples, REO-rich phase regions 20 include rare-earth oxide in excess of stoichiometric rare-earth monosilicate.

Barrier coating 11 includes a graded volumetric distribution of REO-rich phase regions 20 in matrix 14 along direction D from outer surface 18 to inner interface 16. Thus, REO-rich phase regions 20 are not uniformly distributed in matrix 14. For example, REO-rich phase regions 20 may define a plurality of bands 22, where bands 22 are regions of matrix 14 including a higher volume fraction of REO-rich phase regions 20 relative to immediately adjacent regions of matrix 14. As shown in the working examples below, REO-rich phase regions 20 and/or bands may be visibly distinct from the surrounding regions of matrix 14 due to the higher volume fraction of REO-rich phases. In some examples, bands 22 may include spaced apart REO-rich phase regions 20, so that at least some regions 20 are spaced apart from neighboring REO-rich phase regions 20. In some examples, bands 22 may include abutting REO-rich phase regions 20, so that at least some regions 20 abut neighboring REO-rich phase regions 20. In some examples, one or more bands 22 may not include distinct regions 20, and may instead themselves define continuous bands of REO-rich phase regions 20.

REO-rich phase regions 20 may define different spatial configurations constituting bands 22. For example, a band 22A may include a single layer of at least partly spaced REO-rich phase regions 20. Band 22B may include more than one layer, for example, two or more layers of REO-rich phase regions 20. REO-rich phase regions 20 may be regular or irregular spheroidal or ellipsoidal regions, or have any other suitable shape. REO-rich phase regions 20 may have substantially similar sizes and shapes, as shown in bands 22A and 22B. In some examples, REO-rich phase regions 20 may include extended, elongated, or agglomerated regions. For example, band 22C may include relatively larger, irregular, extended, or elongated regions 20. Band 22D includes both small and larger regions.

While bands 22 may be substantially planar, bands 22 may be partially or completely non-planar. For example, one or more bands 22 may be partly planar, and partly non-planar. Band 22E is a curved band defined by REO-rich phase regions 20 distributed along a curved region in matrix 14. Thus, bands 22 may deviate from planarity, and have any suitable shape or follow any suitable contour, such as planar, undulating, zig-zag, corrugated, or curved, or combinations thereof.

In some examples, REO-rich phase regions 20 may not be distributed in discernible bands, and may instead be distributed throughout matrix 14, however, in a predetermined graded non-uniform distribution along the direction D. For example, REO-rich phase regions 20 may define an increasing or a decreasing volumetric distribution along direction D in matrix 14.

Thus, regardless of whether REO-rich phase regions 20 define bands 22, the graded volumetric distribution of REO-rich phase regions 20 defines a first volumetric density of the plurality of REO-rich phase regions 20 within first region 14A of matrix 14 adjacent outer surface 18. Likewise, the graded volumetric distribution of REO-rich phase regions 20 defines a second volumetric density of the plurality of REO-rich phase regions 20 at second region 14B of matrix 14 adjacent inner interface 16. The second volumetric density of REO-rich phase regions 20 is different from the first volumetric density by at least predetermined threshold amount. The predetermined threshold amount may be a fraction of the first volumetric density of REO-rich phase regions 20, for example, at least 0.05, or at least 0.1, or at least 0.2, or at least 0.3, or at least 0.4, or at least 0.5, or any other suitable fraction. In some examples, instead of a threshold difference between the second volumetric density and the first volumetric density, the second volumetric density of REO-rich phase regions 20 may exhibit a predetermined ratio relative to the first volumetric density. For example, the ratio of the second volumetric density of REO-rich phase regions 20 to the first volumetric density may be less than 10, less than 5, less than 1, less than 0.9, less than 0.8, less than 0.7, less than 0.6, less than 0.5, less than 0.4, less than 0.3, less than 0.2, or less than 0.1, or more than 0.1, more than 0.2, more than 0.3, more than 0.4, more than 0.5, more than 0.6, more than 0.7, more than 0.8, more than 0.9, more than 1, or more than 5, or more than 10.

In some examples, the ratio of the second volumetric density of REO-rich phase regions 20 to the first volumetric density is less than 1. Thus, second region 14B may have a lower volumetric distribution of REO-rich phase regions 20 than first region 14A, as shown in FIG. 1A. For example, second region 14B may include less than 10% by volume of REO-rich phase regions 20, third region 14C may include between about 10% and about 30% by volume of REO-rich phase regions 20, and first region 14A includes more than about 30% by volume of REO-rich phase regions 20. In some such examples, second thickness $T_2$ is about 50 micrometers, third thickness $T_3$ is about 50 micrometers, and first thickness $T_1$ is about 25 micrometers. Providing a higher first volumetric density (near outer surface interface 18) may resist CMAS incursion at first region 14A itself, for example, by forming a rare-earth disilicate seal, as described elsewhere in the disclosure. Thus, substrate 12 and inner portions of barrier coating 11 may be protected from CMAS incursion, or incursion of other species or contaminants.

In other examples, the ratio of the first volumetric density of REO-rich phase regions 20 to the second volumetric density is less than 1, as described with reference to FIG. 2.

FIG. 2 is a conceptual cross-sectional view of an example article 30 including an example barrier coating 31 adjacent substrate 12 of a component, where barrier coating 31 has a higher volumetric density of REO-rich phase regions 20 in second region 14B than in first region 14A nearer outer surface 18 of barrier coating 11. In some examples, first region 14A of barrier coating 31 may define a plurality of pores 24. Plurality of pores 24 may include isolated pores, fluidically interconnected pores, or combinations thereof. In some such examples, CMAS or other contaminants may be permitted to migrate to a predetermined region, for example, to first region 14A, or second region 14C, but may be resisted from migrating past second region 14B. Thus, second region 14B may present a relatively dense, high REO-rich phase volumetric concentration region to resist CMAS or other contaminants from affecting substrate 12. In some such examples, REO-rich phase regions 20 may not be present at first region 14A or be present in a lower volumetric fraction than in second region 14B to permit controlled abrasion at first region 14A. For example, REO-rich phase regions 20 may resist abrasion, and reducing the volumetric distribution in first region 14A may permit abrasion of at least first region 14A of barrier coating 31.

Regardless of the distribution of REO-rich phase regions 20, the relative volumetric proportion of rare-earth monosilicate (and or rare-earth oxide) to that of rare-earth disilicate in a region may influence the CTE in that region. For example, as the volumetric proportion of rare earth disilicate increases, the overall CTE may decrease. For example, a region with 10% by volume of Yb monosilicate and 90% by volume of Yb disilicate may exhibit an overall lower CTE of $5.0 \times 10^{-6}/°C$., while a region with 90% by volume of Yb monosilicate and 10% by volume of Yb disilicate may exhibit an overall higher CTE of $7.2 \times 10^{-6}/C$. In some examples, reducing the overall CTE may result in the CTE of barrier coating 11 being closer to the CTE of substrate 12 at inner interface 16, reducing thermal stresses at inner interface and promoting the retention of barrier coating 11 or 31 on substrate 12.

Properties, for example, physical, chemical, or mechanical properties, of REO-rich phase regions and their neighboring regions may depend on the composition of the REO-rich regions and their neighboring regions. The equilibrium phase compositions of systems including rare-earth oxides and silicates (monosilicates or disilicates) at different temperatures may be determined using a phase diagram.

FIG. 3 is a chart illustrating a phase diagram of an ytterbia (ytterbium oxide)-silica (silicon oxide) system. As seen in the phase diagram of FIG. 3, the line marked "A" represents a phase containing 50% by volume $Yb_2Si_2O_5$—50% by volume $Yb_2Si_2O_7$, while the line marked "B" represents a 10% by volume $Yb_2SiO_5$—90% by volume $Yb_2Si_2O_7$. The line marked B represents a phase with better coefficient of thermal expansion (CTE) compatibility with an ytterbium disilicate matrix, than the phase represented by line A. In some examples, a $Yb_2O_3$ rich phase is a phase having between about 34 to 100 mol. % of $Yb_2O_3$ and balance mol. % $SiO_2$ (e.g., at least about 10 vol. % rare earth monosilicate and/or free rare earth oxide, or at least about 20 vol. % rare earth monosilicate and/or free rare earth oxide, or at least about 30 vol. % rare earth monosilicate and/or free rare earth oxide).

The estimated coefficient of thermal expansion (CTE) of phases including different concentrations of ytterbium monosilicate (YbMS) and ytterbium disilicate (YbDS) is given by TABLE 1.

The forming (42) may include one or more of vapor deposition, slurry deposition, electrophoretic deposition, or thermal spraying, for example, air plasma spray, low pressure plasma spray, suspension plasma spray, or high velocity oxy-fuel (HVOF) spraying. The concentration of REO-rich phase regions 20 in barrier coating 14 can be adjusted by controlling spray gun parameters, such as hydrogen flow rate, gun current, standoff distances, and feedstock powder morphologies and sizes. For example, first region 14A may be sprayed using high hydrogen flow, high gun current, long standoff distances, or combinations thereof; third region 14C may be sprayed using moderate hydrogen flow, moderate gun current, moderate standoff distances, or combinations thereof; second region 14B may be sprayed using low hydrogen flow, low gun current, short standoff distances, or combinations thereof. The forming (42) may include a continuous process without stopping the gun or may include multiple spray runs.

In some examples, the forming (42) may include thermal spraying substantially pure (e.g., less than 5 vol. % trace phases of un-reacted rare earth oxide, rare earth monosilicate, silica, and alumina) rare earth disilicate feedstock material and controlling the thermal spray parameters (e.g., gun current and primary argon flow rates) to achieve the desired coating composition (e.g., REO-rich phase content) by volatizing silica from the rare earth disilicate feedstock material. In other examples, the forming (42) may include thermal spraying feedstock material that includes rare earth disilicate and rare earth monosilicate and/or rare earth oxide. The thermal spray parameters may be controlled to achieve the desired coating composition (e.g., REO-rich phase content) by controlling an amount of silica volatized from the feedstock material.

A slurry may be deposited using painting, dip coating, spraying, or the like, followed by drying and sintering. The slurry particles may include the desired composition of the

TABLE 1

| Vol % YbMS | 10 | 20 | 30 | 40 | 50 | 60 | 70 | 80 | 90 |
|---|---|---|---|---|---|---|---|---|---|
| Vol % YbDS | 90 | 80 | 70 | 60 | 50 | 40 | 30 | 20 | 10 |
| Estimated Overall CTE ($\times 10^{6}/°C.$) | 5.0 | 5.3 | 5.5 | 5.8 | 6.1 | 6.4 | 6.7 | 6.9 | 7.2 |

Figure 4:
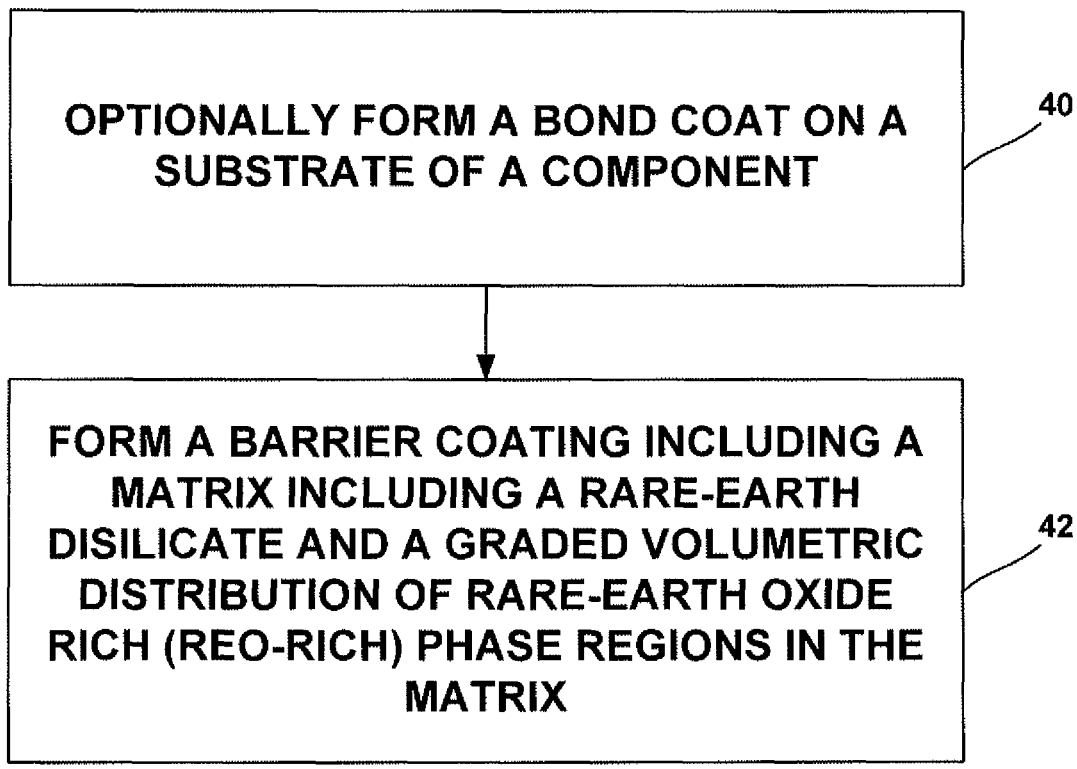
FIG. 4 is a flow diagram illustrating an example technique for forming a barrier coating in accordance with this disclosure.

FIG. 4 is a flow diagram illustrating an example technique for forming a barrier coating in accordance with this disclosure. While the example technique of FIG. 4 is described with reference to article 10 of FIG. 1A, the example technique of FIG. 4 may be used to prepare any example articles according to the disclosure.

The example technique of FIG. 4 optionally includes forming a bond coat on substrate 12 of the component (40). Forming the bond coat may include vapor deposition, spraying, or any suitable technique. The bond coat may include at least one metal, metalloid, alloy, ceramics, and mixtures or combinations thereof. In some examples, the bond coat includes elemental silicon. The bond coat may promote bonding or retention of subsequently deposited or applied layers, for example, barrier coatings, on substrate 12.

The example technique of FIG. 4 includes forming barrier coating 14 on substrate 12 (42). The forming (42) may be performed directly on a surface defined by substrate 12, or on an intermediate layer or coating on substrate 12, for example, on a bond coat.

final coating, or may include precursors, such as Si-rich particles and/or rare earth oxide-rich particles, that react during the sintering process to form the coating with a desired composition, gradient, and the like.

In some examples, the forming (42) includes blending powder with stoichiometric rare-earth disilicate (for example, ytterbium disilicate), stoichiometric rare-earth monosilicate (for example, ytterbium monosilicate), and/or stoichiometric rare-earth oxide (for example, ytterbium oxide) in a predetermined ratio before spraying or slurry coating the blend. In some examples, the REO-rich phase regions 20 may be formed from "splats" of REO-rich powder deposited using thermal spraying. In other examples, the REO-rich phase regions 20 may be formed from fine particulates of REO-rich powder deposited using thermal spraying, e.g., by mixing ball-milled REO-rich powder with rare earth disilicate powder and depositing the mixture using vapor deposition or thermal spraying. Similarly, by selecting powder size and morphology used to form a slurry, the resulting microstructure of the coating may be controlled.

In some examples, the forming (42) includes surface reaction or sol-gel infiltration.

EXAMPLES

Example 1

Figure 5:
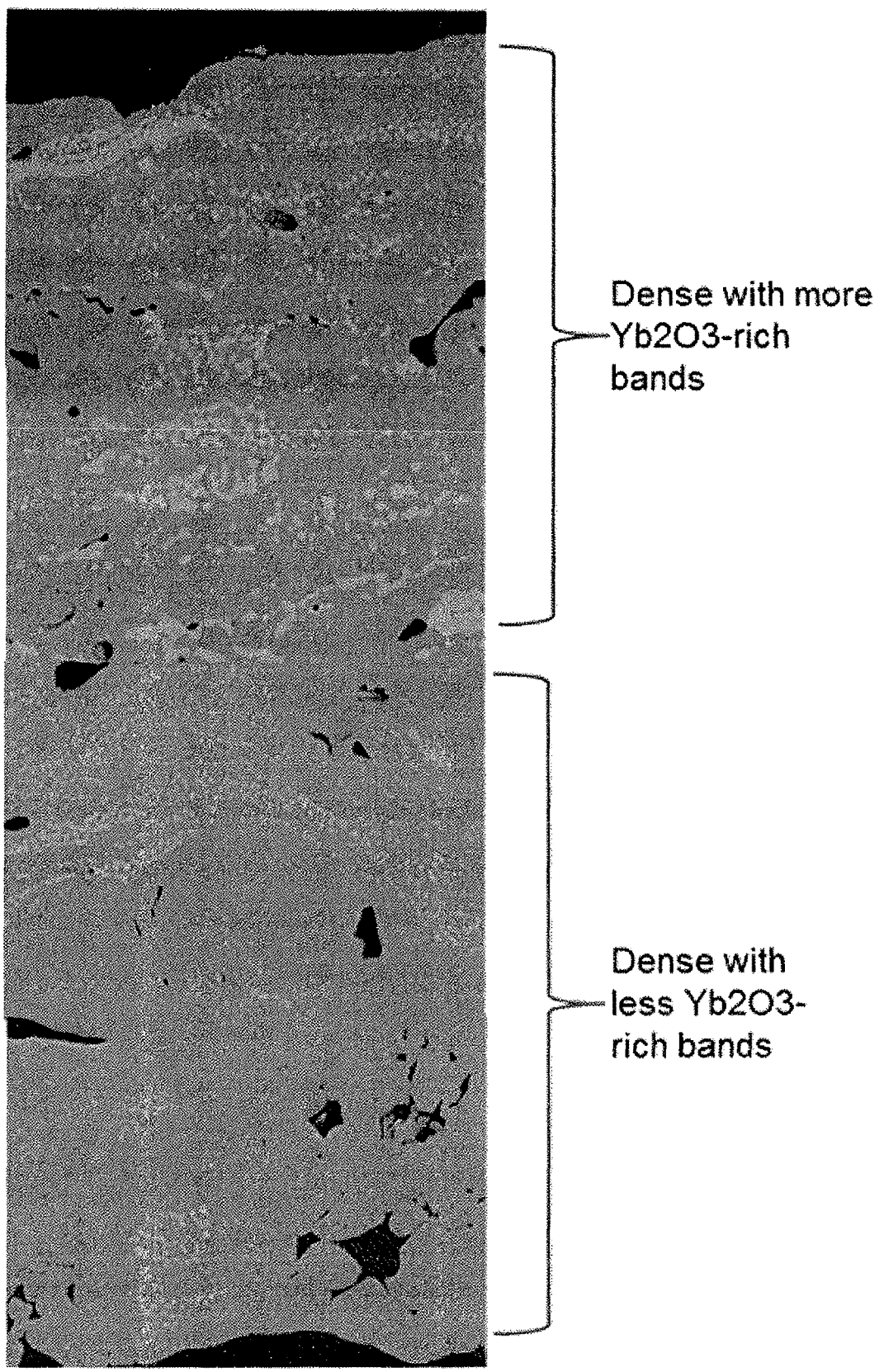
FIG. 5 is a micrograph showing a cross-section of an example barrier coating including an ytterbium disilicate matrix and ytterbia-rich bands within the ytterbium disilicate matrix.

FIG. 5 is a micrograph showing a cross-section of an example coating including an ytterbium disilicate matrix and ytterbia-rich bands within the ytterbium disilicate matrix. The coating was deposited using an SG-100 gun (Praxair) and two types of Yb disilicate powders. The outer region was sprayed with agglomerated and sintered powder, the inner region was sprayed with fused and crushed powder. An inner region of the coating adjacent a substrate was dense with less $Yb_2O_3$-rich bands. An outer region of the coating away from the substrate was dense with more $Yb_2O_3$-rich bands.

Example 2

Figure 6:
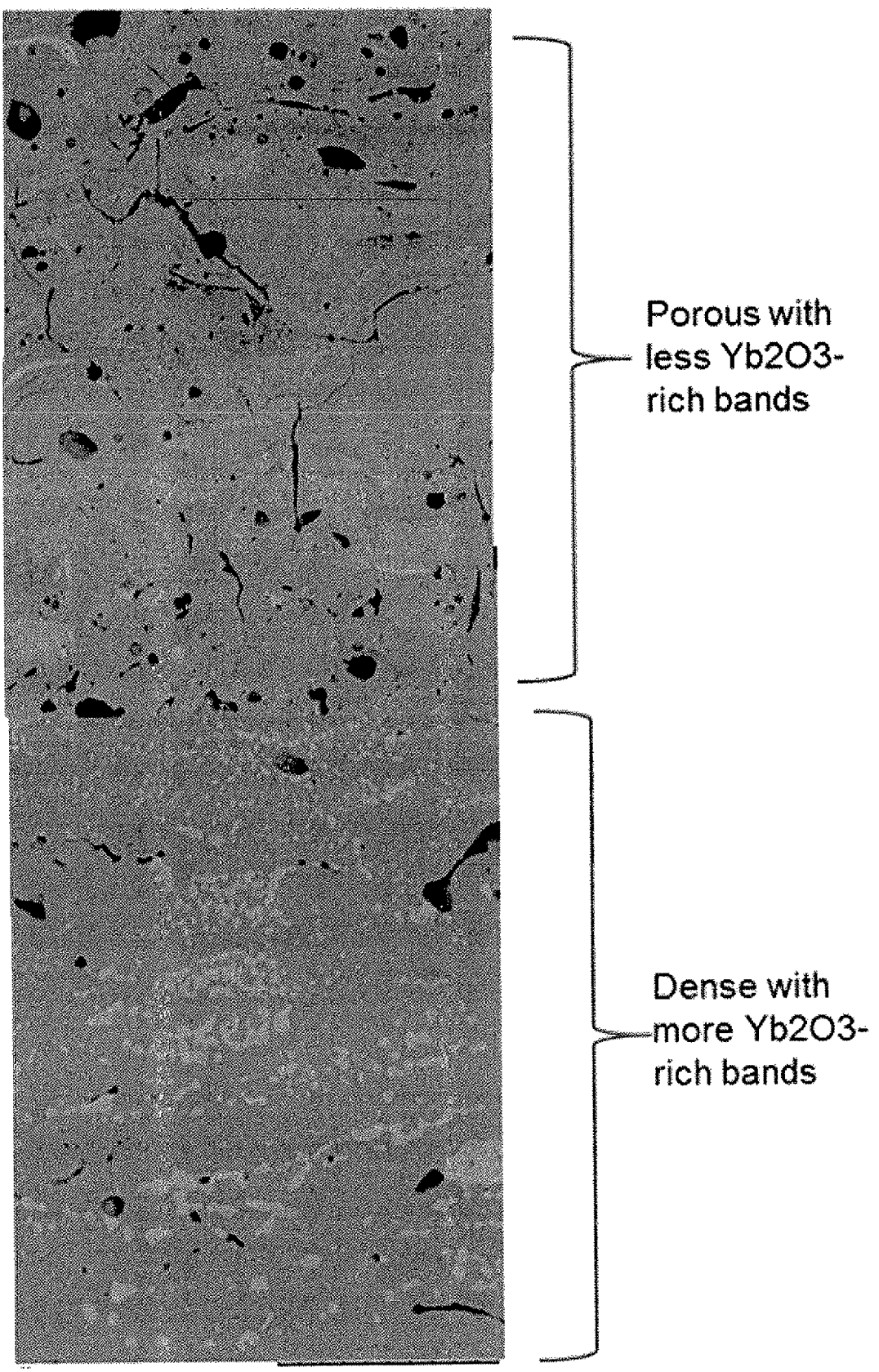
FIG. 6 is a micrograph showing a cross-section of an example barrier coating including a porous ytterbium disilicate matrix and ytterbia-rich bands within the ytterbium disilicate matrix, adjacent a substrate.

FIG. 6 is a micrograph showing a cross-section of an example barrier coating including a porous ytterbium disilicate matrix and ytterbia-rich bands within the ytterbium disilicate matrix, adjacent a substrate. The coating was deposited using both an F4 MB gun (Oerlikon Medco) and SG-100 gun (Praxair) with agglomerated and sintered Yb disilicate powder. Outer region was sprayed with the F4 MB gun and the inner region was sprayed with the SG-100 gun. An inner region of the coating adjacent a substrate was dense with low porosity and more $Yb_2O_3$-rich bands. An outer region of the coating away from the substrate was porous with less $Yb_2O_3$-rich bands.

Comparative Example 1

Figure 7C:
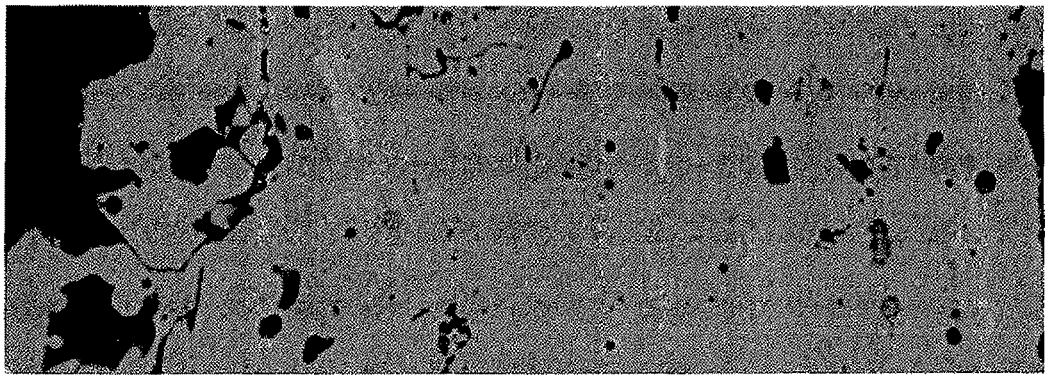
FIG. 7C is a micrograph showing a cross-section of the coating of FIG. 7B after steam exposure.
Figure 7B:
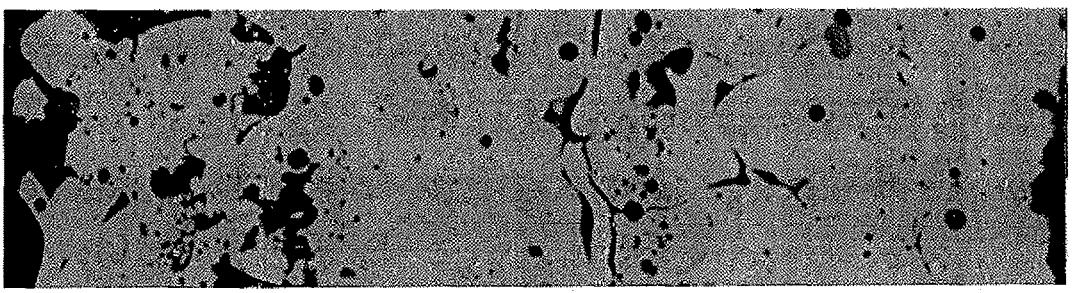
FIG. 7B is a micrograph showing a cross-section of the coating of FIG. 7A after heat treatment.
Figure 7A:
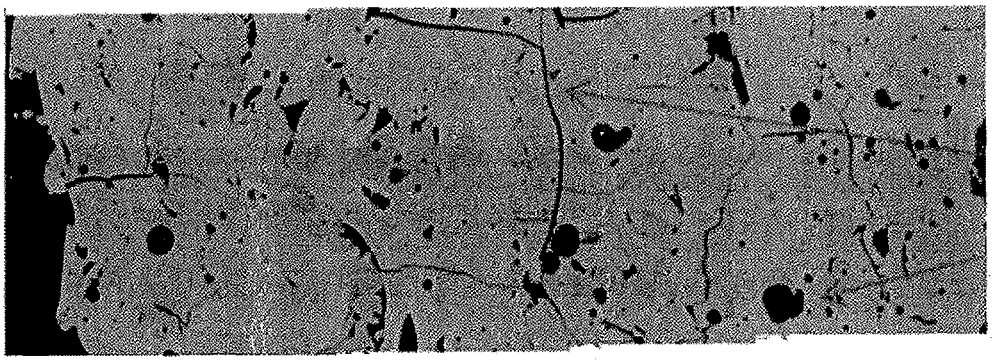
FIG. 7A is a micrograph showing a cross-section of an initial coating including an ytterbium disilicate matrix.

A coating including an ytterbium disilicate matrix but with limited amount of ytterbia-rich regions was prepared. The sample was heat treated, followed by exposure to steam. FIG. 7A is a micrograph showing a cross-section of an initial coating including an ytterbium disilicate matrix. FIG. 7B is a micrograph showing a cross-section of the coating of FIG. 7A after heat treatment. FIG. 7C is a micrograph showing a cross-section of the coating of FIG. 7B after steam exposure. Cracks initially present in the coating persisted or widened after the heat treatment and steam exposure.

Example 3

Figure 8C:
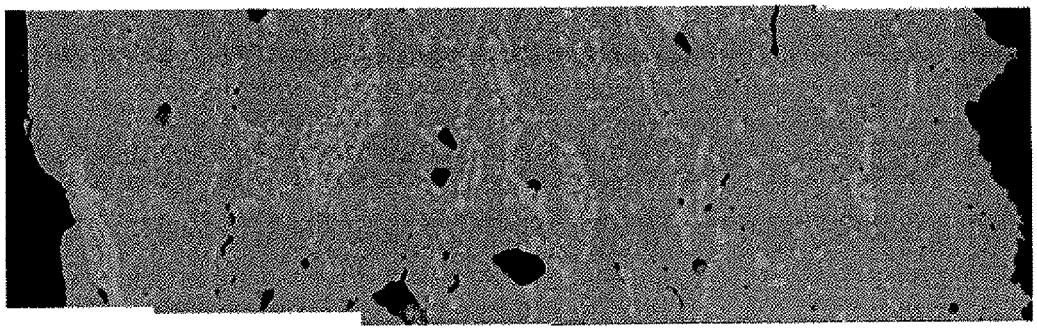
FIG. 8C is a micrograph showing a cross-section of the coating of FIG. 8B after steam exposure.
Figure 8B:
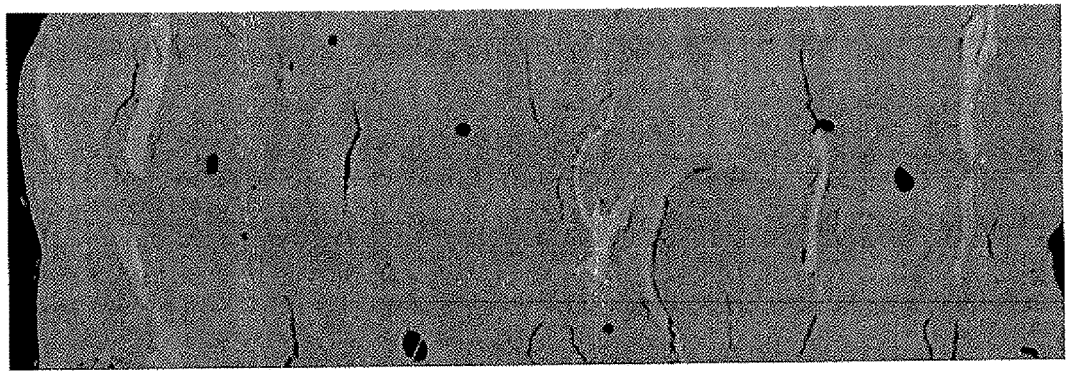
FIG. 8B is a micrograph showing a cross-section of the coating of FIG. 8A after heat treatment.
Figure 8A:
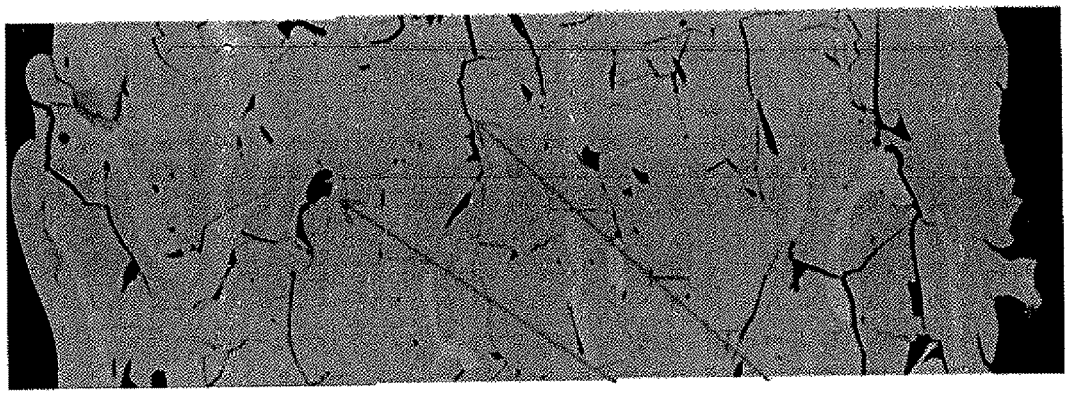
FIG. 8A is a micrograph showing a cross-section of an initial coating including an ytterbium disilicate matrix and ytterbia-rich bands within the ytterbium disilicate matrix.

A coating including an ytterbium disilicate matrix and with ytterbia-rich phase region bands within the ytterbium disilicate matrix was prepared. The sample was heat treated, followed by exposure to steam. FIG. 8A is a photograph showing a cross-section of an initial coating including an ytterbium disilicate matrix and ytterbia-rich bands within the ytterbium disilicate matrix. FIG. 8B is a photograph showing a cross-section of the coating of FIG. 8A after heat treatment. FIG. 8C is a photograph showing a cross-section of the coating of FIG. 8B after steam exposure. Cracks initially present reduced or disappeared after the heat treatment and steam exposure.

Example 4

Figure 9:
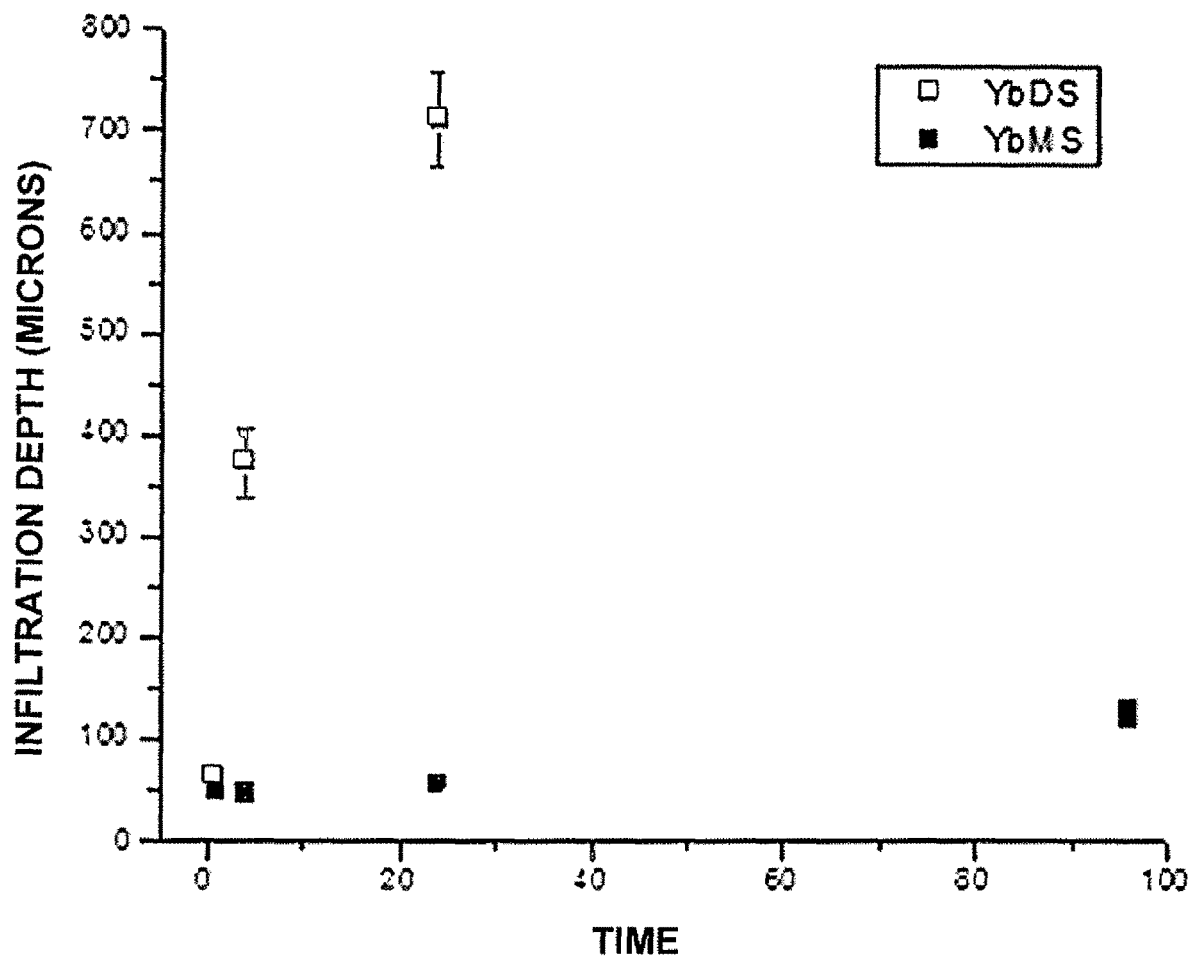
FIG. 9 is a chart showing infiltration depth of CMAS over time for ytterbium disilicate (YbDS) and ytterbium monosilicate (YbMS).

The CMAS resistance of ytterbium disilicate coating was compared to that of ytterbium monosilicate coating. Spark plasma sintering pellets were prepared. FIG. 9 is a chart showing infiltration depth of CMAS over time for ytterbium disilicate (YbDS) and ytterbium monosilicate (YbMS). As seen in FIG. 9, the infiltration depth of CMAS was significantly lower for YbMS, indicating better CMAS resistance.

Example 5

Figure 10:
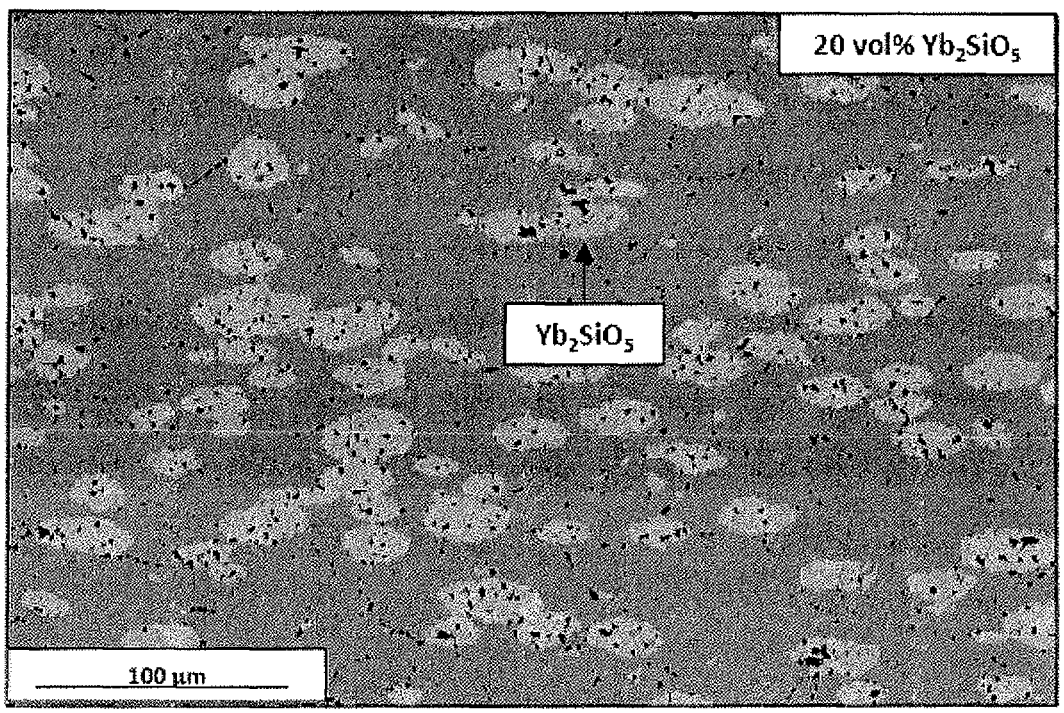
FIG. 10 is a micrograph illustrating an example in which ytterbium monosilicate powder was sufficiently large that the REO-rich regions deposited as "splats" in a ytterbium disilicate matrix as part of an spark plasma sintering process.
Figure 11:
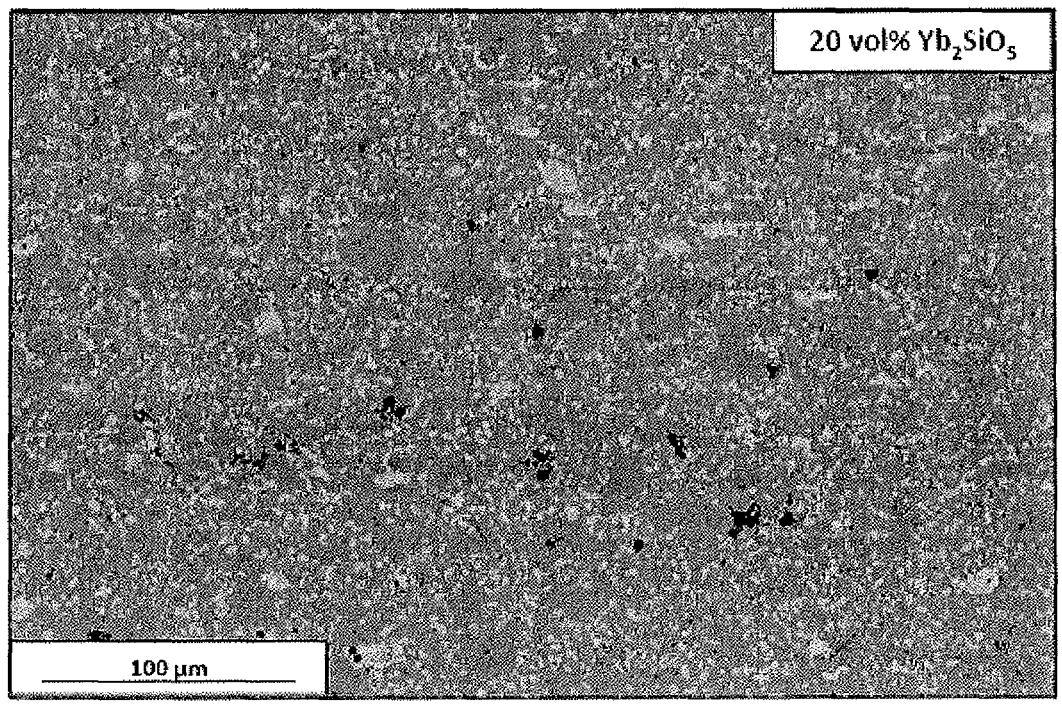
FIG. 11 is a micrograph illustrating an example in which ytterbium monosilicate powder was ball-milled to form a finer dispersion of ytterbium monosilicate within a ytterbium disilicate matrix.

Samples including 0 vol. %, 10 vol. %, 20 vol. %, and 30 vol. % ytterbium monosilicate and a balance ytterbium disilicate were depositing prepared using spark plasma sintering. FIG. 10 is a micrograph illustrating an example in which ytterbium monosilicate powder was sufficiently large that the REO-rich regions were formed as "splats" as part of the spark plasma sintering. In the example of FIG. 10, ytterbium monosilicate constituted about 20 vol. % of the sample. FIG. 11 is a micrograph illustrating an example in which ytterbium monosilicate powder was ball-milled to form a finer dispersion of ytterbium monosilicate within ytterbium disilicate. In the example of FIG. 11, ytterbium monosilicate constituted about 20 vol. % of the sample.

Figure 12A:
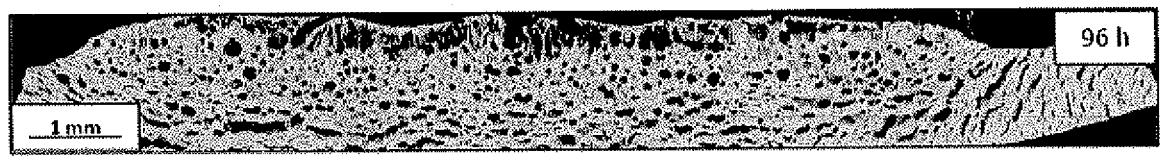
FIGS. 12A-12D illustrate results of samples including 0 vol. %, 10 vol. %, 20 vol. %, and 30 vol. % ytterbium monosilicate "splats" after being exposed to a model of CMAS having a molar composition of $Ca_{33}Mg_9Al_{13}Si_{45}$ at 1300° C. for about 96 hours in a stagnant air box furnace.
Figure 12B:
Figure 12C:
Figure 12D:
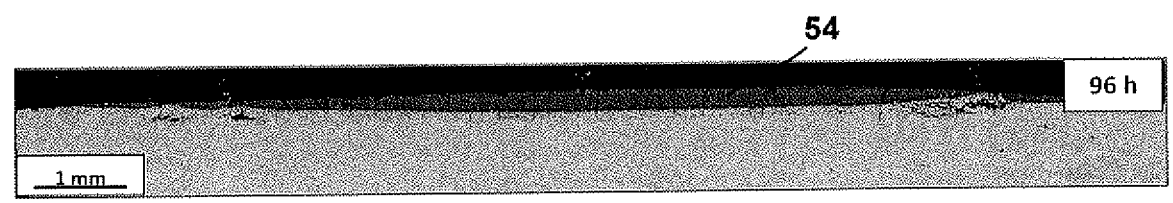
Figure 13:
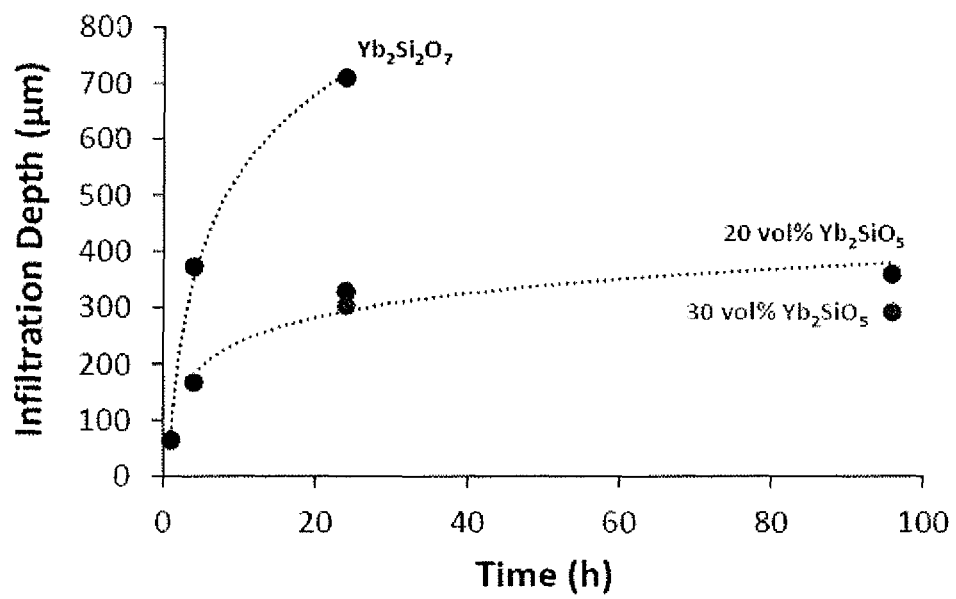
FIG. 13 is a plot of infiltration depth of CMAS into samples including ytterbium disilicate matrix and ytterbium monosilicate splats.

The samples were then exposed to a model of CMAS having a molar composition of $Ca_{33}Mg_9Al_{13}Si_{45}$ at 1300° C. for up to 96 hours in a stagnant air box furnace. FIGS. 12A-12D illustrate results of the samples including 0 vol. %, 10 vol. %, 20 vol. %, and 30 vol. % ytterbium monosilicate "splats." As shown in FIGS. 12C and 12D compared to FIGS. 12A and 12B, samples with 20 and 30 vol. % ytterbium monosilicate exhibited improved resistance to CMAS attack. FIGS. 12A and 12B illustrate relatively large regions of increased porosity formed by CMAS attack, while FIGS. 12C and 12D illustrate unreacted CMAS glass 52, 54 on the surface of the freestanding sample and lower amounts of porosity due to reaction with CMAS. FIG. 13 is a plot of infiltration depth of CMAS into the samples similar to those of FIGS. 12A, 12C, and 12D as a function of time. As shown in FIG. 13, the depth of infiltration and the infiltration rate were lower for the samples including 20 vol. % and 30 vol. % ytterbium monosilicate than for the sample including only ytterbium disilicate.

Figure 14:
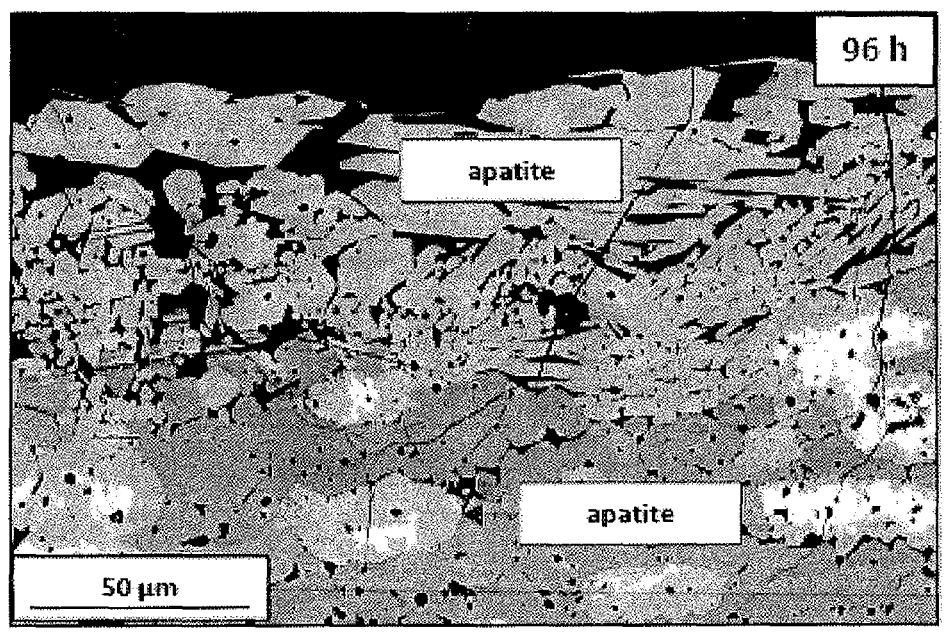
FIG. 14 is a micrograph illustrating an example of microstructure of a sample including 20 vol. % ytterbium monosilicate and a balance ytterbium disilicate, after exposure to a CMAS model at 1300° C. for about 96 hours in a stagnant air box furnace.

FIG. 14 is a micrograph illustrating an example of microstructure of a sample including 20 vol. % ytterbium monosilicate and a balance ytterbium disilicate, after exposure to the CMAS model at 1300° C. for about 96 hours in a stagnant air box furnace. As shown in FIG. 13, CaO preferentially reacts with $Yb_2SiO_5$ and forms darker apatite at the surface and around the $Yb_2SiO_5$ splats.

Figure 15A:
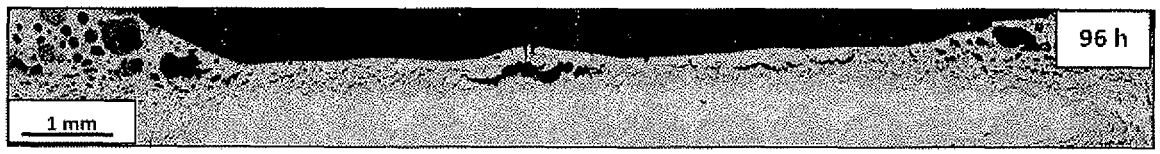
FIGS. 15A-15C illustrate results of samples including 0 vol. %, 20 vol. %, and 30 vol. % ytterbium monosilicate fine particulates in ytterbium disilicate after exposure to a CMAS model at 1300° C. for about 96 hours in a stagnant air box furnace.
Figure 15B:
Figure 15C:

FIGS. 15A-15C are micrographs illustrating results of samples including 0 vol. %, 20 vol. %, and 30 vol. % ytterbium monosilicate fine particulates after exposure to a CMAS model at 1300° C. for about 96 hours in a stagnant air box furnace. As shown in FIGS. 15B and 15C compared to FIG. 15A, samples with 20 and 30 vol. % ytterbium monosilicate exhibited improved resistance to CMAS attack.

Example 6

Coatings including about 3.24 vol. % ytterbium monosilicate and a balance ytterbium disilicate, about 9.20 vol. % ytterbium monosilicate and a balance ytterbium disilicate, about 12.37 vol. % ytterbium monosilicate and a balance ytterbium disilicate, about 19.20 vol. % ytterbium monosilicate and a balance ytterbium disilicate, and about 50.43 vol. % ytterbium monosilicate and a balance ytterbium disilicate were deposited on respective graphite blocks using thermal spraying. Feedstock of the samples included pure ytterbium disilicate powder (less than 5 vol % trace phases of un-reacted $Yb_2O_3$, $Yb_2SiO_5$, $SiO_2$, and $Al_2O_3$). The gun current and primary argon flow rates were controlled to achieve the desired coating composition. Compositions were determined using quantitative XRD against samples with known ratios of ytterbium disilicate and ytterbium monosilicate.

After spraying, the coatings were removed from the graphite blocks using a razor blade to leave a freestanding coating. The freestanding coatings were heat treated for 2 hours at about 1200° C. prior to CMAS resistance testing. Samples were tested for CMAS resistance by loading between about 20 mg/cm² and about 25 mg/cm² CMAS with a content of about 11.27 wt. % $Al_2O_3$, about 29.47 wt. % CaO, about 7.75 wt. % MgO, about 50.45 wt. % $SiO_2$, about 0.06 wt. % $Fe_2O_3$, about 0.45 wt. % $ZrO_2$, and a balance other components on each respective freestanding coating. The CMAS-loaded samples were heated at about 1300° C. and 1400° C. for about 8 hours and 96 hours.

Figure 16A:
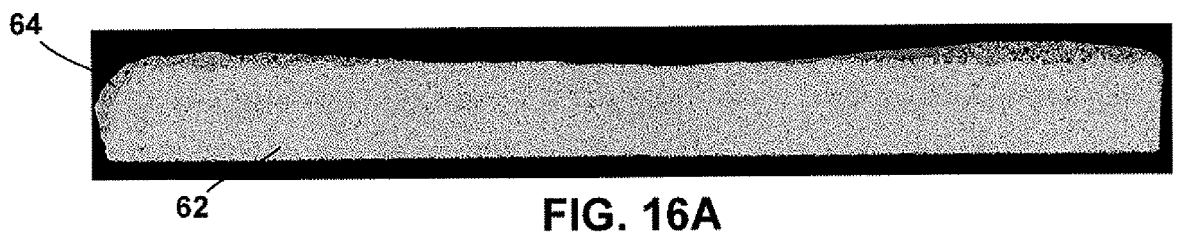
FIGS. 16A-16E are micrographs illustrating results of samples including about 3.24 vol. % ytterbium monosilicate and a balance ytterbium disilicate, about 9.20 vol. % ytterbium monosilicate and a balance ytterbium disilicate, about 12.37 vol. % ytterbium monosilicate and a balance ytterbium disilicate, about 19.20 vol. % ytterbium monosilicate and a balance ytterbium disilicate, and about 50.43 vol. wt. % ytterbium monosilicate and a balance ytterbium disilicate, respectively, after CMAS exposure.
Figure 16B:
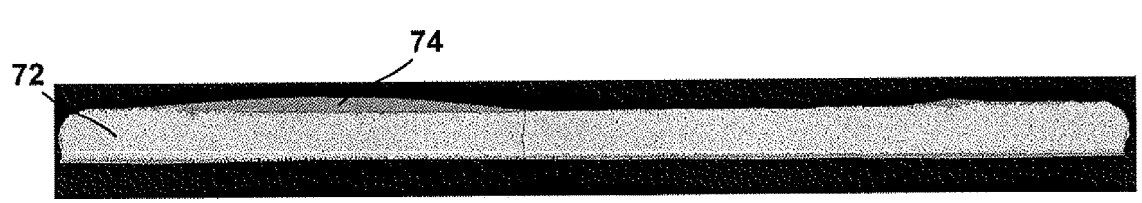
Figure 16C:
Figure 16D:
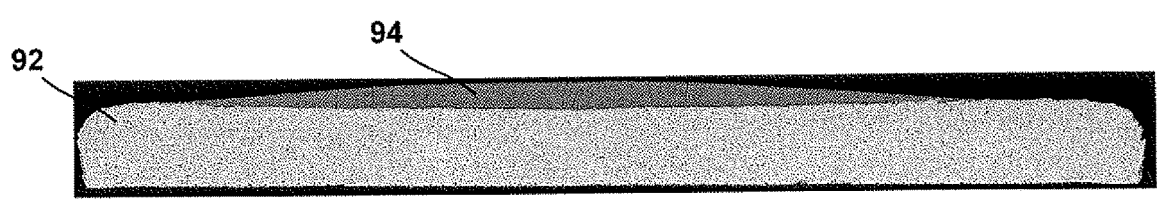
Figure 16E:
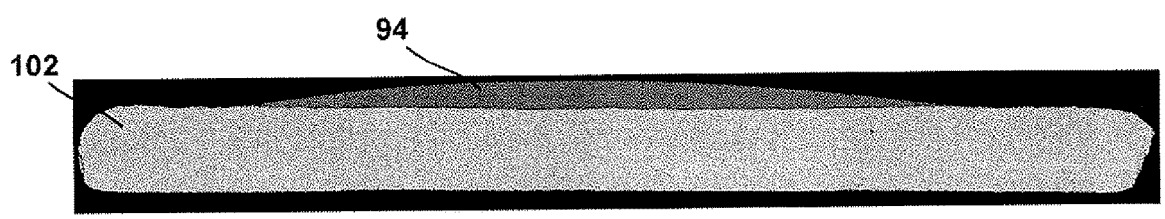

FIGS. 16A-16E are micrographs illustrating results of samples including about 3.24 vol. % ytterbium monosilicate and a balance ytterbium disilicate, about 9.20 vol. % ytterbium monosilicate and a balance ytterbium disilicate, about 12.37 vol. % ytterbium monosilicate and a balance ytterbium disilicate, about 19.20 vol. % ytterbium monosilicate and a balance ytterbium disilicate, and about 50.43 vol. % ytterbium monosilicate and a balance ytterbium disilicate, respectively, after CMAS exposure. FIGS. 16A-16E show freestanding coatings 62, 72, 82, 92, and 102, respectively. FIG. 16A also shows reaction zone 64 formed by reaction of CMAS with freestanding coating 62, while FIGS. 16B-16E illustrate residual CMAS 74, 84, 94, and 104 on the surface of freestanding coatings 72, 82, 92, and 102.

Figure 17A:
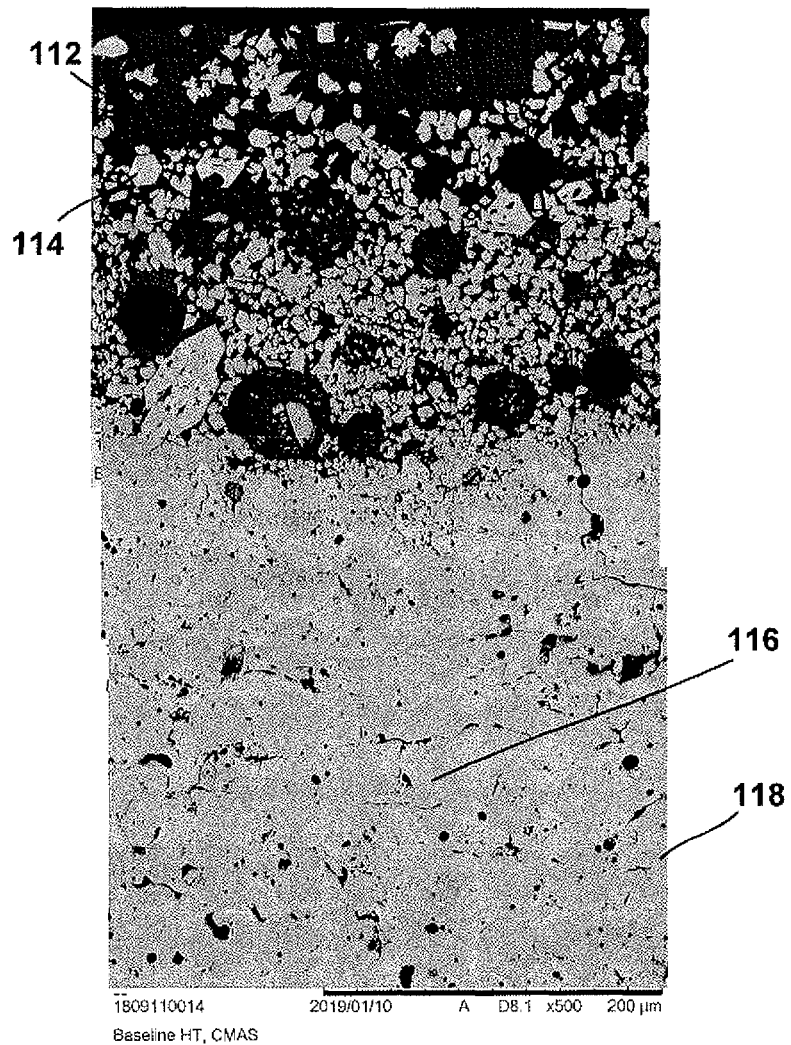

FIGS. 17A-17P are magnified views of portions of some of the samples shown in FIGS. 16A-16E. As shown in FIG. 17A, residual CMAS 112 remains on a surface of the sample. Apatite 114 formed from reaction between components of CMAS (e.g., CaO) and ytterbium monosilicate. Also visible in FIG. 17A are regions of ytterbium monosilicate 116 and regions of ytterbium disilicate 118.

FIGS. 17B-17F illustrate magnified view of a portion of samples including about 3.24 vol. % ytterbium monosilicate after exposure to different conditions. FIG. 17B shows the sample prior to being exposed to CMAS. FIG. 17C shows the sample after being exposed to CMAS for 8 hours at 1300° C. FIG. 17D shows the sample after being exposed to CMAS for 96 hours at 1300° C. FIG. 17E shows the sample after being exposed to CMAS for 8 hours at 1400° C. FIG. 17F shows the sample after being exposed to CMAS for 96 hours at 1400° C.

FIGS. 17G-17K illustrate magnified view of a portion of samples including about 19.20 vol. % ytterbium monosilicate after exposure to different conditions. FIG. 17G shows the sample prior to being exposed to CMAS. FIG. 17H shows the sample after being exposed to CMAS for 8 hours at 1300° C. FIG. 17I shows the sample after being exposed to CMAS for 96 hours at 1300° C. FIG. 17J shows the sample after being exposed to CMAS for 8 hours at 1400° C. FIG. 17K shows the sample after being exposed to CMAS for 96 hours at 1400° C.

FIGS. 17L-17P illustrate magnified view of a portion of samples including about 50.43 vol. % ytterbium monosilicate after exposure to different conditions. FIG. 17L shows the sample prior to being exposed to CMAS. FIG. 17M shows the sample after being exposed to CMAS for 8 hours at 1300° C. FIG. 17N shows the sample after being exposed to CMAS for 96 hours at 1300° C. FIG. 17O shows the sample after being exposed to CMAS for 8 hours at 1400° C. FIG. 17P shows the sample after being exposed to CMAS for 96 hours at 1400° C.

Figure 18A:
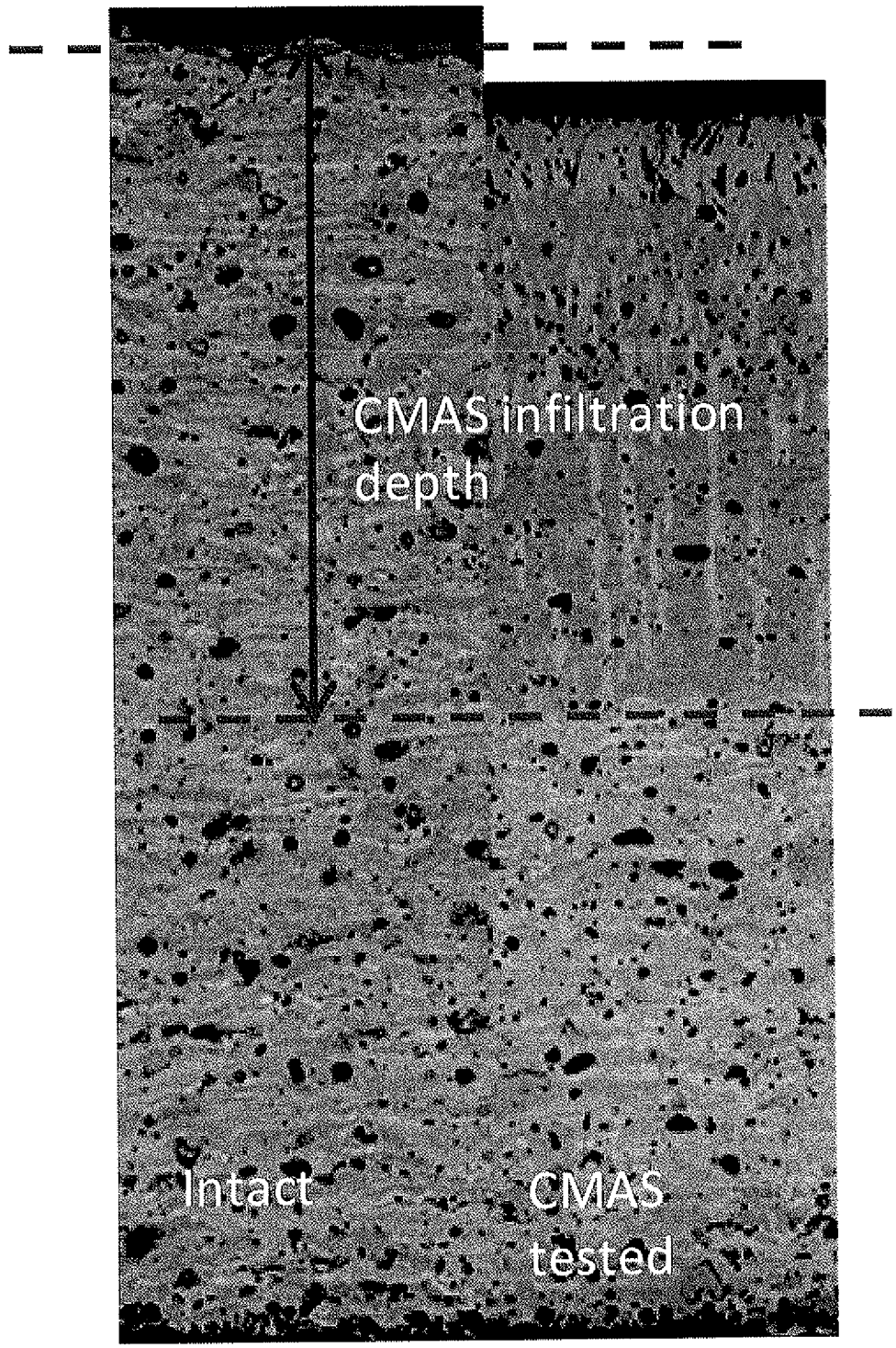
FIG. 18A is an image illustrating how CMAS-infiltration depth was calculated for the samples shown in FIGS. 17B-17P.

FIG. 18A is an image illustrating how CMAS-infiltration depth was calculated for the samples shown in FIGS. 17B-17P. As shown in FIG. 18A, an image of the sample prior to testing was aligned with an image of the coating after CMAS exposure testing such that the bottom surfaces of the samples were aligned. A depth of CMAS infiltration into the sample was then determined by measuring the lowest point of CMAS infiltration from an original height of the coating.

Figure 18B:
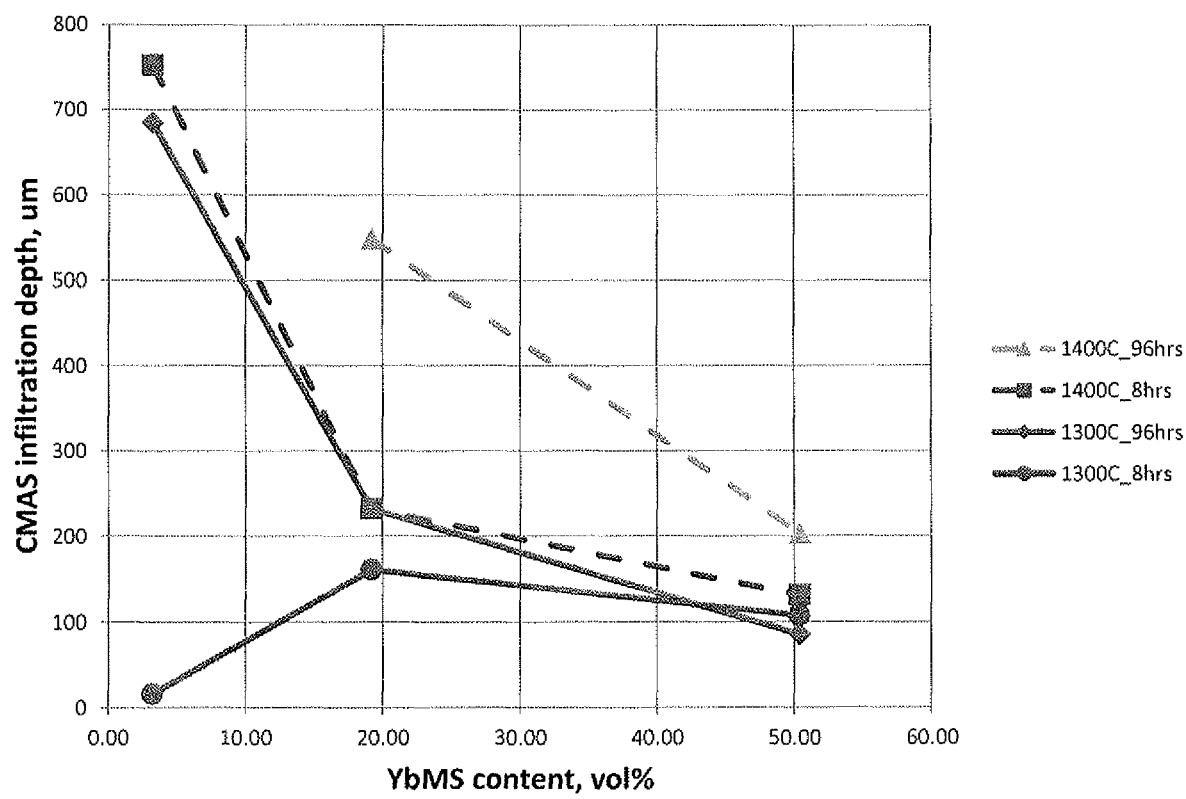
FIG. 18B is a plot of CMAS infiltration depth versus ytterbium monosilicate content for the conditions shown in FIGS. 17B-17P.

FIG. 18B is a plot of CMAS infiltration depth versus ytterbium monosilicate content for the conditions shown in FIGS. 17B-17P. As shown in FIG. 18B, increasing ytterbium monosilicate content generally reduced CMAS infiltration depth. For the sample including 3.24 vol. % ytterbium monosilicate heated at 1300° C. for 8 hours, the sample initially dissolved at a lower rate and swelled, which led to the small apparent CMAS infiltration depth.

Example 7

Figure 19:
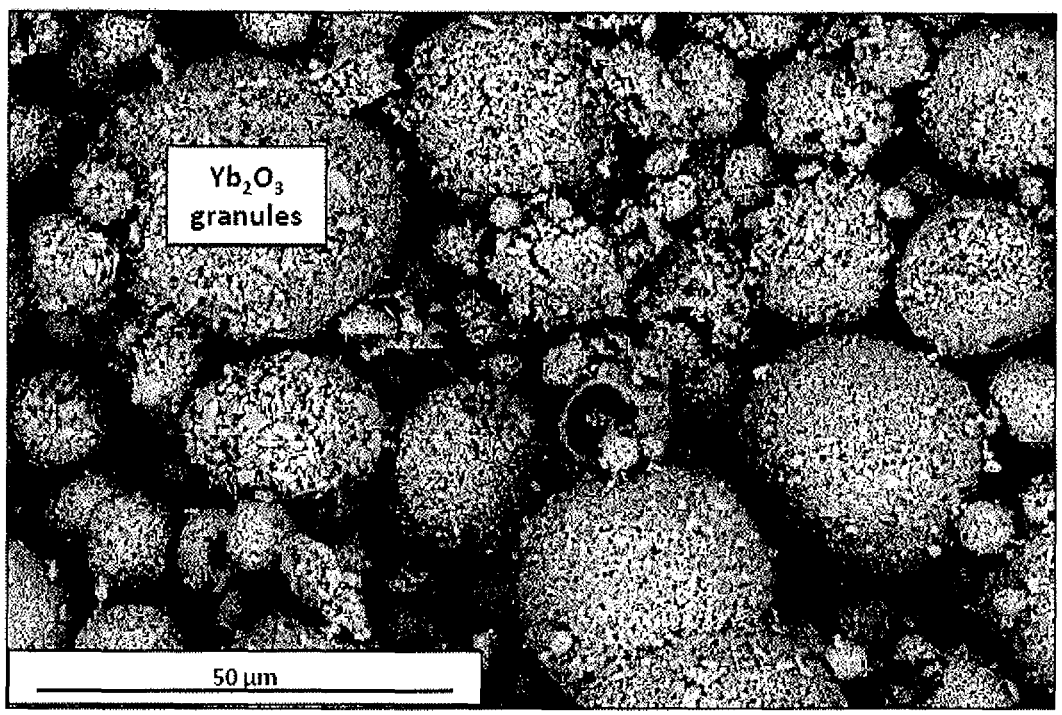
FIG. 19 is a micrograph of an example ytterbium oxide powder.
Figure 20:
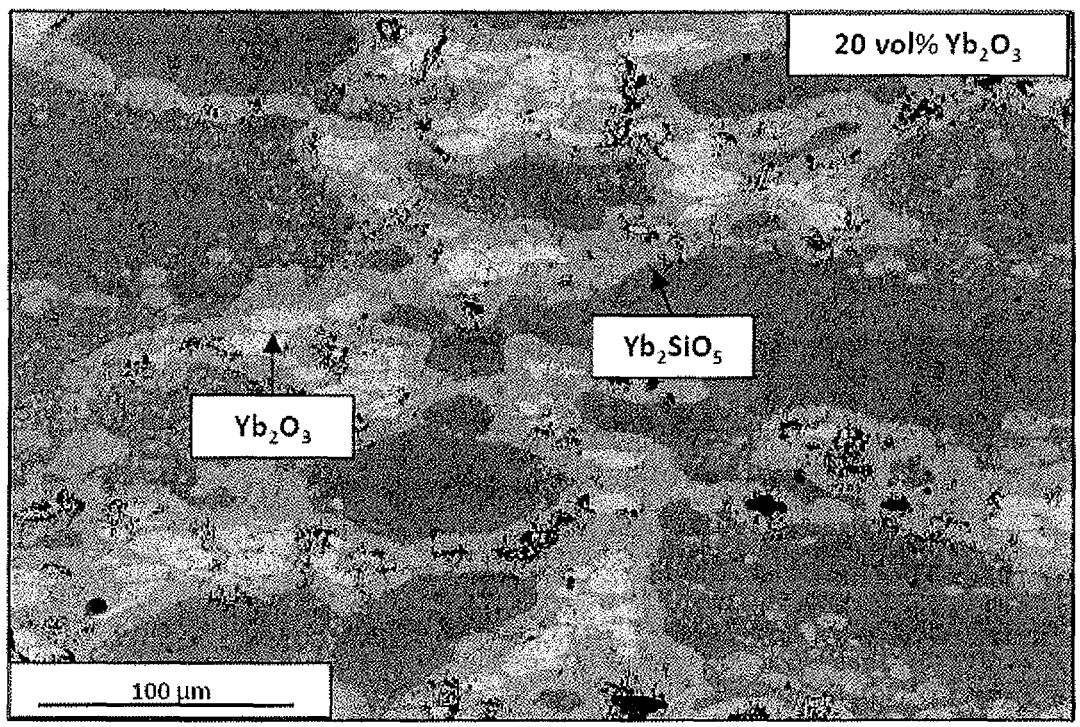
FIG. 20 is a micrograph of a sample formed from a powder including 20 vol. % ytterbium oxide coarse particles and a balance ytterbium disilicate.

Samples were formed from materials including 0 vol. %, 10 vol. %, and 20 vol. % ytterbium oxide and a balance ytterbium disilicate using spark plasma sintering. FIG. 19 is a micrograph of ytterbium oxide powder used to form the material. FIG. 20 is a micrograph illustrating an example in which ytterbium oxide powder was sufficiently large that the REO-rich regions formed as "splats" as part of the spark plasma sintering process. In the example of FIG. 20, ytterbium oxide constituted about 20 vol. % of the sample. As shown in FIG. 20, ytterbium oxide reacted with ytterbium disilicate in an equilibrium reaction to form ytterbium monosilicate at the interface between the ytterbium oxide "splats" and the ytterbium silicate. The extent of reaction was diffusion limited; the reaction did not proceed to completion prior to cooling of the sample.

Figure 21:
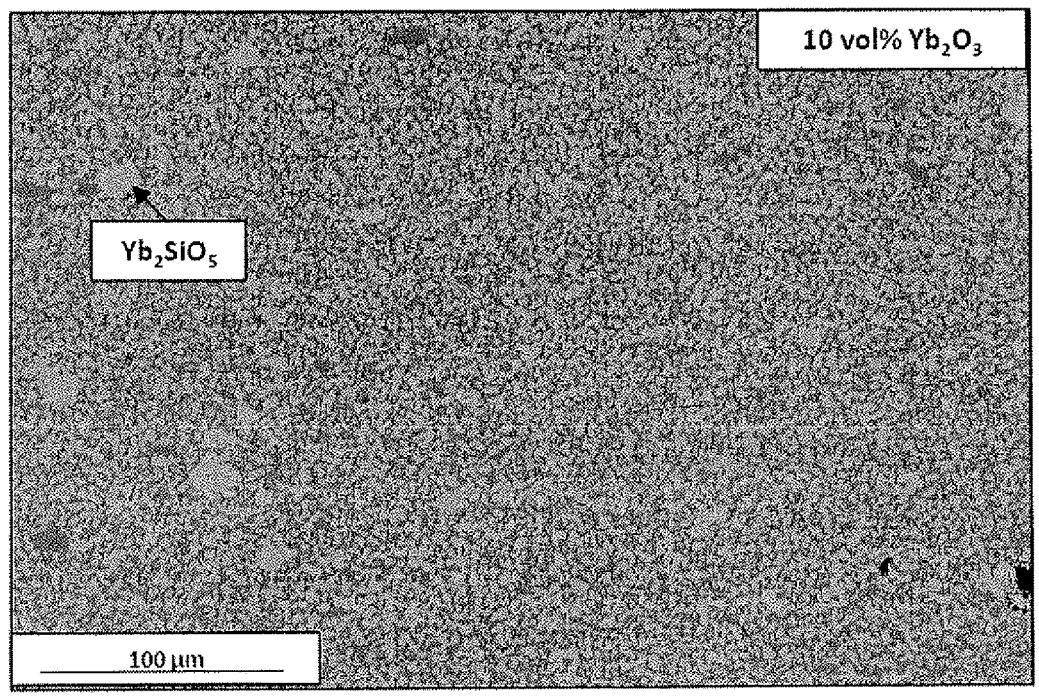
FIG. 21 is a micrograph of a sample formed from a powder including 20 vol. % ytterbium oxide fine particles and a balance ytterbium disilicate.

FIG. 21 is a micrograph illustrating an example in which ytterbium oxide powder was ball-milled to form a finer dispersion of ytterbium oxide within ytterbium disilicate. In the example of FIG. 21, ytterbium oxide constituted about 10 vol. % of the sample material. As shown in FIG. 21, substantially all the ytterbium oxide reacted to form ytterbium monosilicate in the sample after plasma spark sintering.

Figure 22:
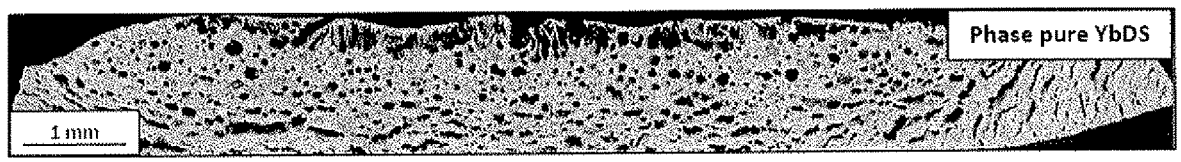
FIGS. 22-24 are micrographs illustrating samples formed from a powder including 0 vol. %, 10 vol. % and 20 vol. % ytterbium oxide coarse particles and a balance ytterbium disilicate, after exposure to a CMAS model at 1300° C. for about 96 hours in a stagnant air box furnace.
Figure 23:
Figure 24:
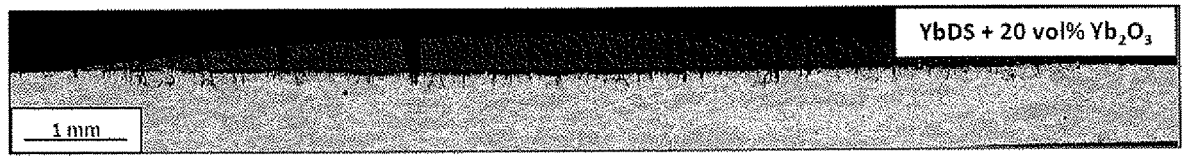

The samples were then exposed to a model of CMAS having a molar composition of $Ca_{33}Mg_9Al_{13}Si_{45}$ at 1300° C. for up to 96 hours in a stagnant air box furnace. FIGS. 22-24 illustrate results of the samples formed from materials including 0 vol. %, 10 vol. %, and 20 vol. % coarse ytterbium oxide powder. As seen in FIGS. 23 and 24, samples formed from materials having 10 vol. % and 20 vol. % coarse ytterbium oxide powder exhibited improved CMAS resistance compared to the sample formed from pure ytterbium disilicate, although the sample deposited from coating materials having 10 vol. % coarse ytterbium oxide powder had large ytterbium disilicate domains susceptible to CMAS attack.

Figure 25:
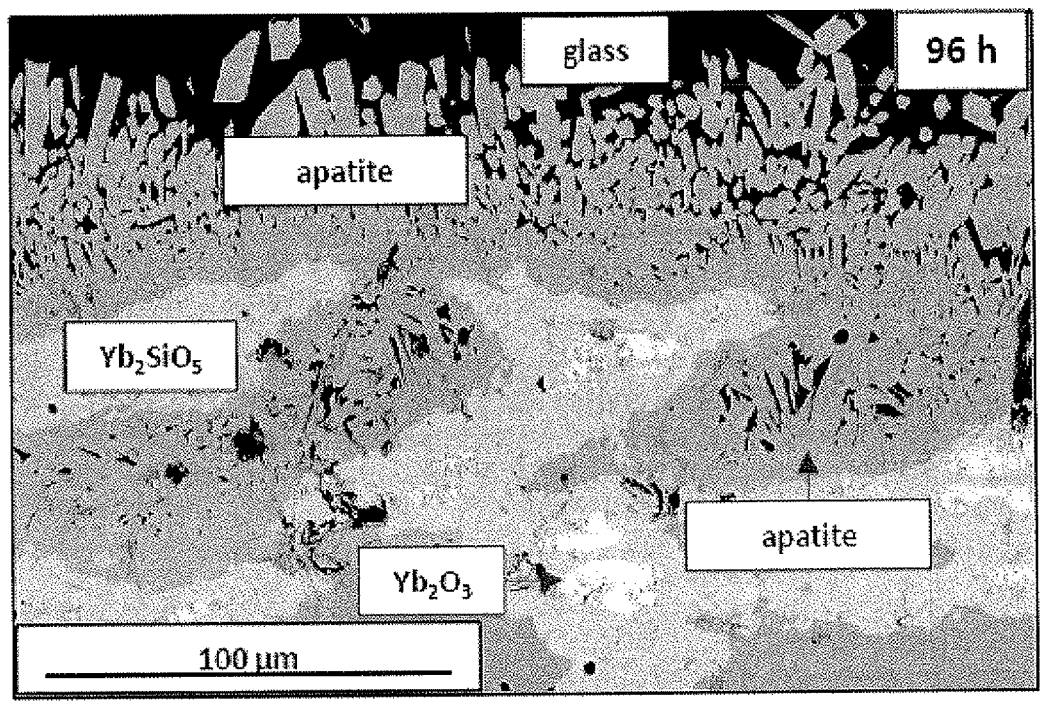
FIG. 25 is a magnified view of the sample shown in FIG. 24.

FIG. 25 is a magnified view of the sample shown in FIG. 24. As seen in FIG. 25, apatite formed at the interface between CMAS and the sample and reduced or substantially halted CMAS attack of the remainder of the sample.

Figure 26:
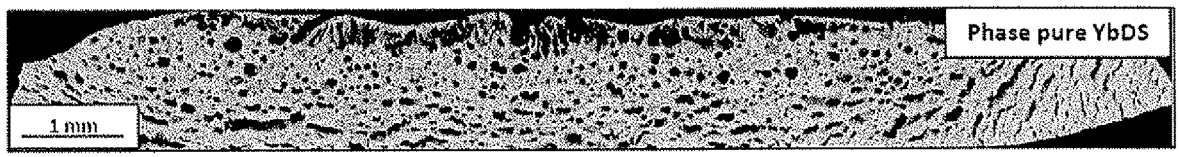
FIGS. 26-28 are micrographs illustrating samples formed from a powder including 0 vol. %, 10 vol. % and 20 vol. % ytterbium oxide fine particles and a balance ytterbium disilicate, after exposure to a CMAS model at 1300° C. for about 96 hours in a stagnant air box furnace.
Figure 27:
Figure 28:
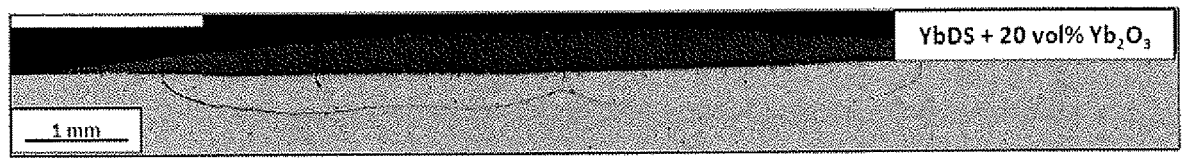

FIGS. 26-28 are micrographs illustrating samples formed from a material including 0 vol. %, 10 vol. % and 20 vol. % fine ytterbium oxide particles and a balance ytterbium disilicate, after exposure to a CMAS model at 1300° C. for about 96 hours in a stagnant air box furnace. As seen in FIGS. 27 and 28, samples formed from materials having 10 vol. % and 20 vol. % fine ytterbium oxide powder exhibited improved CMAS resistance compared to the sample formed from pure ytterbium disilicate.

Figure 29:
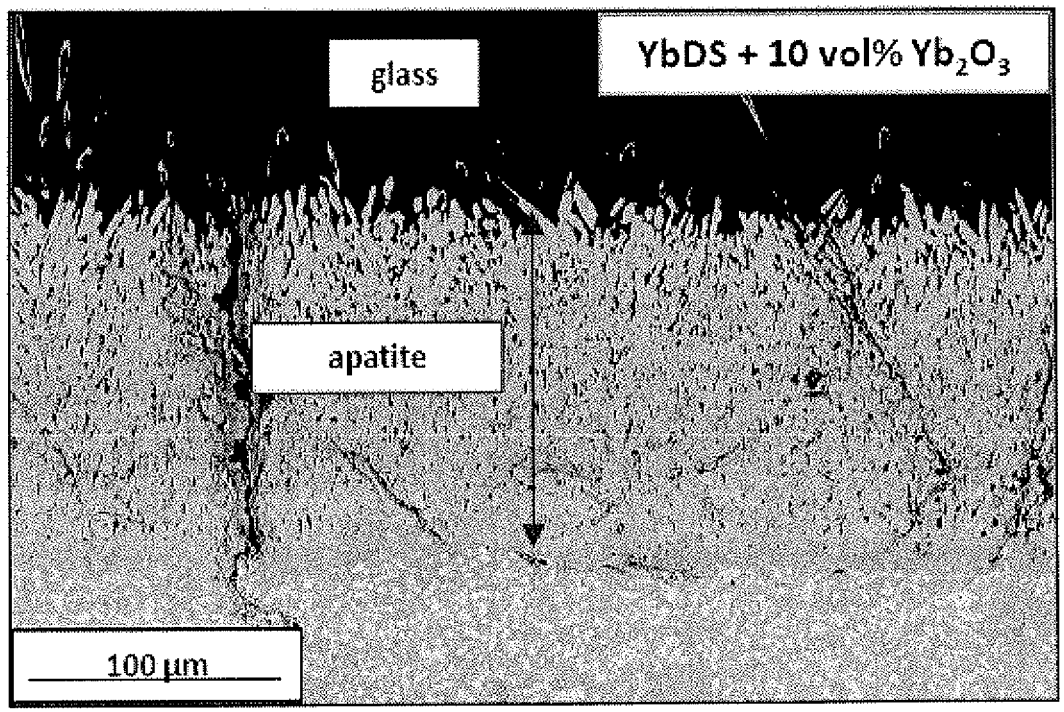
FIG. 29 is a magnified view of the sample shown in FIG. 27.
Figure 30:
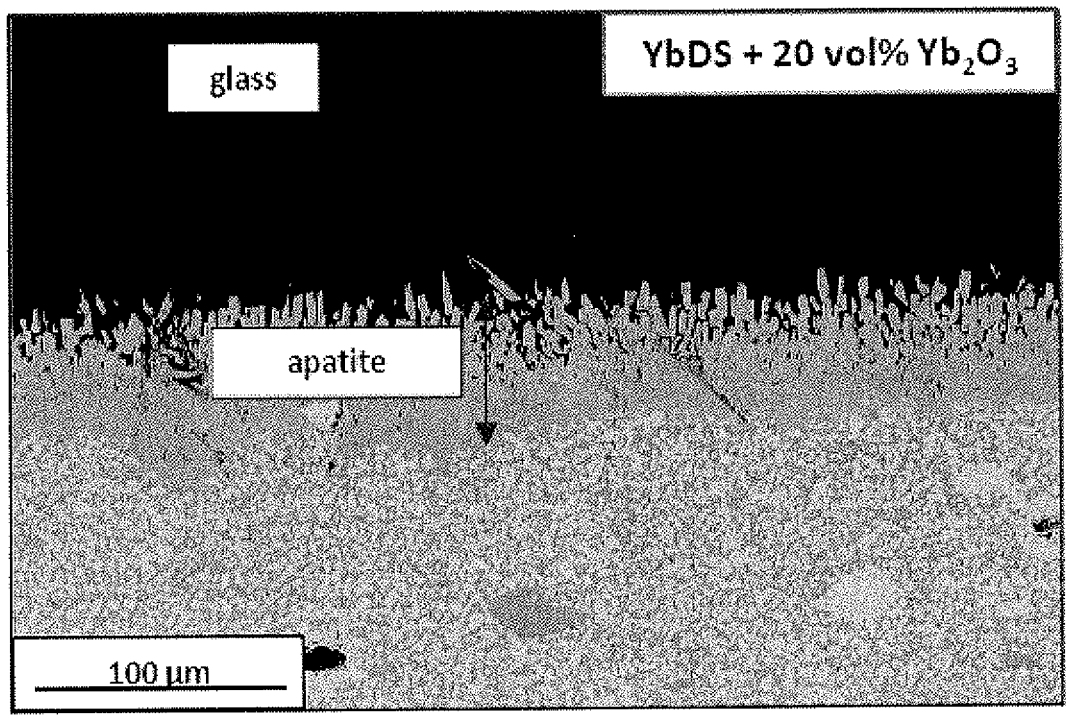
FIG. 30 is a magnified view of the sample shown in FIG. 28.

FIG. 29 is a magnified view of the sample shown in FIG. 27, and FIG. 30 is a magnified view of the sample shown in FIG. 28. As seen in FIGS. 29 and 30, apatite formed at the interface between CMAS and the sample and reduced or substantially halted CMAS attack of the remainder of the coating. Additionally, substantially no glass spreading was observed as in the examples formed from a fine mixture of ytterbium disilicate and ytterbium monosilicate.

Example 8

FIGS. 31A-31F are micrographs illustrating samples formed with different layer combinations before and after CMAS exposure. FIGS. 31A-31C illustrate micrographs of samples with different coating architectures before exposure to CMAS. The layers had properties shown in Table 1.

TABLE 1

| Label | Porosity % | Density g/mL | Ytterbium Monosilicate content Vol. % |
|---|---|---|---|
| B | 1.81 | 5992 | 9.20 |
| C | 4.58 | 5.926 | 19.20 |
| D | 3.97 | 6.332 | 50.43 |

The samples were exposed to CMAS at a loading of 1 mg/cm$^2$ every 25 heating cycles (about 1.5 mg/cm$^2$ for the sample shown in FIGS. 31C and 31F). Each heating cycle included heating at a temperature of about 1316° C. for about 1 hour. Each sample was exposed to a total of 50 heating cycles. As shown in FIGS. 31D-31F, the two-layer and three-layer samples shown in FIGS. 31E and 31F exhibited greater resistance to CMAS infiltration and shown the smaller CMAS infiltration depth compared to the one-layer sample shown in FIG. 31D.

Various examples have been described. These and other examples are within the scope of the following claims.

What is claimed is:

1. An article comprising:
a substrate of a gas turbine engine component;
and a barrier coating on the substrate, the barrier coating comprising:
a matrix comprising a rare-earth disilicate, the matrix extending from an inner interface facing the substrate to an outer surface opposite the inner interface;
and a graded volumetric distribution of rare-earth oxide rich (REO-rich) phase regions in the matrix along a direction from the inner interface to the outer surface,
wherein the REO-rich phase regions define bands in predetermined locations within the matrix,
wherein the REO-rich phase regions include rare-earth oxide in excess of stoichiometric rare-earth monosilicate,
wherein the matrix has a higher porosity in the first region nearer the outer surface than in the second region nearer the inner interface; wherein the barrier coating defines a coating thickness along the direction from the outer surface to the inner interface, wherein the first region defines a first thickness along the direction, wherein the second region defines a second thickness along the direction, and wherein a ratio of the first thickness to the coating thickness is greater than 0.1, and
wherein a ratio of the second thickness to the coating thickness is greater than 0.1.

2. The article of claim 1, wherein a sum of the ratio of the first thickness to the coating thickness and the ratio of the second thickness to the coating thickness is 1.

3. The article of claim 1, wherein the coating thickness is between 50 micrometers and 500 micrometers.

4. The article of claim 1, wherein a third region between the second region and the first region comprises between 10% and 30% by volume of the REO-rich phase regions.

5. The article of claim 1, wherein the second region defines a thickness of 50 microns in the direction from the outer surface to the inner interface, and wherein the first region defines a thickness of 25 microns in the direction from the outer surface to the inner interface.

6. The article of claim 1, wherein the rare-earth disilicate comprises ytterbium disilicate, and wherein the REO-rich phase regions comprise free ytterbium oxide.

7. The article of claim 1, further comprising a bond coat on at least a portion of the substrate, wherein the barrier coating is on the bond coat.

8. The article of claim 1, wherein the article comprises a gas turbine engine component, and wherein the barrier coating comprises an environmental barrier coating.

9. The article of claim 4, wherein the second region defines a thickness of 50 microns in the direction from the outer surface to the inner interface, wherein the third region defines a thickness of 50 microns in the direction from the outer surface to the inner interface, and wherein the first region defines a thickness of 25 microns in the direction from the outer surface to the inner interface.

10. The article of claim 1, wherein the matrix has a porosity comprising between 1.81% and 4.58%.

11. An article comprising:
a substrate of a gas turbine engine component; and
a barrier coating on the substrate, the barrier coating comprising:
a matrix comprising a rare-earth disilicate, the matrix extending from an inner interface facing the substrate to an outer surface opposite the inner interface, the matrix further comprising:
a first layer adjacent the inner interface comprising about 10% by volume ytterbium monosilicate and about 90% by volume ytterbium disilicate, and wherein the first layer further comprises a porosity of 1.81%; and
a second layer adjacent the outer surface comprising about 50% by volume ytterbium monosilicate and about 50% by volume ytterbium disilicate, and wherein the first layer further comprises a porosity of 3.97%; and
wherein the barrier coating defines a coating thickness along a direction from the outer surface to the inner interface, wherein the second layer defines a first thickness along the direction, wherein the first layer defines a second thickness along the direction, and wherein a ratio of the first thickness to the coating thickness is greater than 0.1, and wherein a ratio of the second thickness to the coating thickness is greater than 0.1.

* * * * *